US012596712B2

(12) United States Patent
Zhou et al.

(10) Patent No.: US 12,596,712 B2
(45) Date of Patent: Apr. 7, 2026

(54) QUERY-AGNOSTIC FLEXIBLE APPLICATION PROGRAM INTERFACE

(71) Applicant: U.S. BANK NATIONAL ASSOCIATION, Minneapolis, MN (US)

(72) Inventors: Todd Tao Zhou, San Mateo, CA (US); Sylvia Qing Su, San Jose, CA (US); Yuhui Huang, Chino, CA (US); Yijun Zhang, Everett, WA (US)

(73) Assignee: U.S. BANK NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 18/896,250

(22) Filed: Sep. 25, 2024

(65) Prior Publication Data

US 2026/0087005 A1     Mar. 26, 2026

(51) Int. Cl.
*G06F 16/2453* (2019.01)

(52) U.S. Cl.
CPC .............................. *G06F 16/24537* (2019.01)

(58) Field of Classification Search
CPC ................................................ G06F 16/24537
See application file for complete search history.

(56) References Cited

U.S. PATENT DOCUMENTS

| | | | |
|---|---|---|---|
| 8,954,461 B2 | 2/2015 | Ware et al. | |
| 9,244,971 B1 | 1/2016 | Kalki | |
| 11,074,305 B1 | 7/2021 | Ruiz et al. | |
| 2002/0133504 A1* | 9/2002 | Vlahos | G06F 16/256 |
| 2007/0130136 A1* | 6/2007 | Cambot | G06F 16/25 |
| 2010/0250486 A1* | 9/2010 | Brunner | G06F 16/958 |
| | | | 707/E17.108 |
| 2012/0066247 A1* | 3/2012 | Tsoungui | G06F 16/2428 |
| | | | 707/769 |
| 2016/0057229 A1 | 2/2016 | Barton et al. | |
| 2016/0314212 A1* | 10/2016 | Menday | G06F 16/24522 |
| 2018/0157698 A1* | 6/2018 | Southall | G06F 3/0484 |
| 2018/0285170 A1* | 10/2018 | Gamon | G06N 7/01 |
| 2019/0034482 A1* | 1/2019 | Werner | G06F 16/2393 |
| 2021/0216288 A1* | 7/2021 | Bahrami | G06F 11/3688 |
| 2023/0409819 A1* | 12/2023 | Werr | G06F 40/186 |

* cited by examiner

*Primary Examiner* — Marc S Somers
(74) *Attorney, Agent, or Firm* — Alston & Bird LLP

(57) ABSTRACT

Various embodiments relate to generating constrained data reports. In some embodiments, an apparatus receives a constrained data report request; generates, an optimized request-agnostic query by: generating a plurality of query-specific instructions by, for each repository constraint of the one or more repository constraints, retrieving, from a plurality of query-specific scripts, a query-specific script and transforming the query-specific script into a query-specific instruction; and generating the optimized request-agnostic query based on the plurality of query-specific instructions; retrieves, from a repository associated with the resource endpoint and by executing the optimized request-agnostic query, an optimized request-agnostic results set; generates, based at least in part on the optimized request-agnostic results set and the one or more report constraints, a constrained data report; and provides, to the requesting entity, the constrained data report.

20 Claims, 7 Drawing Sheets

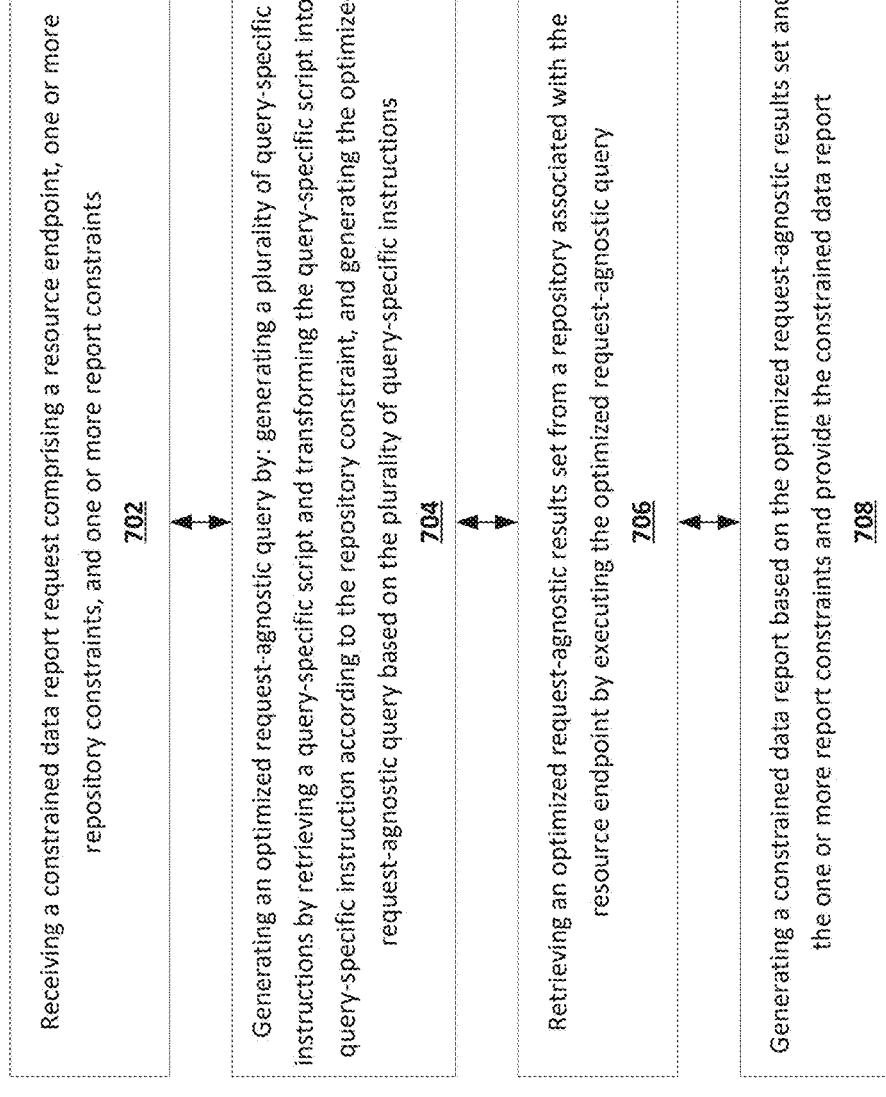

700

Receiving a constrained data report request comprising a resource endpoint, one or more repository constraints, and one or more report constraints
702

Generating an optimized request-agnostic query by: generating a plurality of query-specific instructions by retrieving a query-specific script and transforming the query-specific script into a query-specific instruction according to the repository constraint, and generating the optimized request-agnostic query based on the plurality of query-specific instructions
704

Retrieving an optimized request-agnostic results set from a repository associated with the resource endpoint by executing the optimized request-agnostic query
706

Generating a constrained data report based on the optimized request-agnostic results set and the one or more report constraints and provide the constrained data report
708

FIG. 7

QUERY-AGNOSTIC FLEXIBLE APPLICATION PROGRAM INTERFACE

FIELD OF THE INVENTION

The present disclosure relates to systems, methods, and apparatuses for generating constrained data reports.

BACKGROUND

Application program interfaces (APIs) are essential in many applications and environments for querying data stored in repositories. APIs may be hindered by deficiencies, particularly at scale and in real time scenarios where queries need to accommodate for various user preferences. Applicant has identified a number of additional challenges associated with using APIs for data retrieval. Through applied effort, ingenuity, and innovation many deficiencies of existing systems have been solved by developing solutions that are in accordance with the embodiments as discussed herein, many examples of which are described in detail herein.

BRIEF SUMMARY

In general, embodiments of the present disclosure provided herein may relate to generating and providing constrained data reports. Other implementations for constrained data reports will be, or will become, apparent to one with skill in the art upon examination of the following figures and detailed description. It is intended that all such additional implementations be included within this description be within the scope of the disclosure and be protected by the following claims.

Various embodiments are directed to apparatuses, methods, computer-readable media, computer program products, and systems related to generating constrained data reports. Various embodiments may include an apparatus comprising at least one processor and at least one memory, the at least one memory comprising computer coded instructions therein, wherein the computer coded instructions are configured to, when executed by the at least one processor, cause the apparatus to: receive, from a requesting entity, a constrained data report request comprising a resource endpoint, one or more repository constraints, and one or more report constraints; generate, based at least in part on the constrained data report request, an optimized request-agnostic query by: generating a plurality of query-specific instructions by, for each repository constraint of the one or more repository constraints, retrieving, from a plurality of query-specific scripts, a query-specific script and transforming the query-specific script into a query-specific instruction according to the repository constraint; and generating the optimized request-agnostic query based on the plurality of query-specific instructions; retrieve, from a repository associated with the resource endpoint and by executing the optimized request-agnostic query, an optimized request-agnostic results set; generate, based at least in part on the optimized request-agnostic results set and the one or more report constraints, a constrained data report; and provide, to the requesting entity, the constrained data report.

In various embodiments, the constrained data report request comprises an API call associated with a query-agnostic flexible API. In various embodiments, the constrained data report request comprises at least 1) a first query portion comprising the resource endpoint, wherein the resource endpoint is associated with the repository, 2) a second query portion comprising an endpoint action, wherein retrieving the optimized request-agnostic results set is performed based at least in part on the endpoint action, 3) a third query portion comprising the one or more repository constraints, and 4) a fourth query portion comprising the one or more report constraints.

In various embodiments, the computer coded instructions are configured to, when executed by the at least one processor, further cause the apparatus to: parse the constrained data report request to identify at least the resource endpoint, the endpoint action, the one or more repository constraints, and the one or more report constraints; identify a flexible data report generator based at least in part on the resource endpoint; and provide at least the one or more repository constraints to the flexible data report generator.

In various embodiments, the constrained data report is based on a constrained data report model, and wherein the computer coded instructions are configured to, when executed by the at least one processor, further cause the apparatus to: generate the constrained data report model by: providing at least the one or more repository constraints to a base report repository associated with the flexible data report generator; receiving, from the base report repository, an object-oriented data entity model comprising one or more data entities, the one or more data entities comprising the optimized request-agnostic results set; and generating the constrained data report model based at least on the one or more data entities of the object-oriented data entity model.

In various embodiments, the computer coded instructions are configured to, when executed by the at least one processor, further cause the apparatus to: provide the constrained data report model to a data report request controller; generate the constrained data report by modifying the constrained data report model according to the one or more report constraints; and wherein the constrained data report is provided to the requesting entity via the data report request controller.

In various embodiments, generating the constrained data report model further comprises: generating one or more report enrichment data entities based at least on the one or more data entities of the object-oriented data entity model; and generating the constrained data report model based at least on the one or more data entities of the object-oriented data entity model and the one or more report enrichment data entities.

In various embodiments, one or more of the plurality of query-specific scripts are defined by a query-agnostic flexible API report repository, wherein the query-agnostic flexible API report repository extends the base report repository.

In various embodiments, transforming the query-specific script into the query-specific instruction according to the repository constraint is based on the base report repository in a case where the base report repository defines the query-specific script and is based on the query-agnostic flexible API report repository in a case where the query-agnostic flexible API report repository defines the query-specific script.

In various embodiments, executing the optimized request-agnostic query is based at least in part on the query-agnostic flexible API report repository.

In various embodiments, the query-agnostic flexible API report repository defines a relationship mapping between one or more of the one or more repository constraints, one or more of the plurality of query-specific scripts, and one or more query-specific instructions.

Various embodiments are directed to a computer-implemented method comprising: receiving, from a requesting entity, a constrained data report request comprising a resource endpoint, one or more repository constraints, and one or more report constraints; generating, based at least in part on the constrained data report request, an optimized request-agnostic query by: generating a plurality of query-specific instructions by, for each repository constraint of the one or more repository constraints, retrieving, from a plurality of query-specific scripts, a query-specific script and transforming the query-specific script into a query-specific instruction according to the repository constraint; and generating the optimized request-agnostic query based on the plurality of query-specific instructions; retrieving, from a repository associated with the resource endpoint and by executing the optimized request-agnostic query, an optimized request-agnostic results set; generating, based at least in part on the optimized request-agnostic results set and the one or more report constraints, a constrained data report; and providing, to the requesting entity, the constrained data report.

In various embodiments, the constrained data report request comprises an API call associated with a query-agnostic flexible API. In various embodiments, the constrained data report request comprises at least 1) a first query portion comprising the resource endpoint, wherein the resource endpoint is associated with the repository, 2) a second query portion comprising an endpoint action, wherein retrieving the optimized request-agnostic results set is performed based at least in part on the endpoint action, 3) a third query portion comprising the one or more repository constraints, and 4) a fourth query portion comprising the one or more report constraints.

In various embodiments, the computer-implemented method further comprises parsing the constrained data report request to identify at least the resource endpoint, the endpoint action, the one or more repository constraints, and the one or more report constraints; identifying a flexible data report generator based at least in part on the resource endpoint; and providing at least the one or more repository constraints to the flexible data report generator.

In various embodiments, the constrained data report is based on a constrained data report model and the computer-implemented method further comprises: generating the constrained data report model by: providing at least the one or more repository constraints to a base report repository associated with the flexible data report generator; receiving, from the base report repository, an object-oriented data entity model comprising one or more data entities, the one or more data entities comprising the optimized request-agnostic results set; and generating the constrained data report model based at least on the one or more data entities of the object-oriented data entity model.

In various embodiments, the computer-implemented method further comprises providing the constrained data report model to a data report request controller; generating the constrained data report by modifying the constrained data report model according to the one or more report constraints; and wherein the constrained data report is provided to the requesting entity via the data report request controller.

In various embodiments, generating the constrained data report model further comprises: generating one or more report enrichment data entities based at least on the one or more data entities of the object-oriented data entity model; and generating the constrained data report model based at least on the one or more data entities of the object-oriented data entity model and the one or more report enrichment data entities.

In various embodiments, one or more of the plurality of query-specific scripts are defined by a query-agnostic flexible API report repository, wherein the query-agnostic flexible API report repository extends the base report repository.

In various embodiments, a computer program product comprises at least one computer-readable storage medium having computer-readable program code portions stored therein, the computer-readable program code portions comprising executable portions configured to cause at least one processor to: receive, from a requesting entity, a constrained data report request comprising a resource endpoint, one or more repository constraints, and one or more report constraints; generate, based at least in part on the constrained data report request, an optimized request-agnostic query by: generating a plurality of query-specific instructions by, for each repository constraint of the one or more repository constraints, retrieving, from a plurality of query-specific scripts, a query-specific script and transforming the query-specific script into a query-specific instruction according to the repository constraint; and generating the optimized request-agnostic query based on the plurality of query-specific instructions; retrieve, from a repository associated with the resource endpoint and by executing the optimized request-agnostic query, an optimized request-agnostic results set; generate, based at least in part on the optimized request-agnostic results set and the one or more report constraints, a constrained data report; and provide, to the requesting entity, the constrained data report.

BRIEF DESCRIPTION OF THE DRAWINGS

Reference will now be made to the accompanying drawings, which are not necessarily drawn to scale, and wherein:

FIG. 7 illustrates an example flowchart depicting operations for generating constrained data reports in accordance with at least some embodiments of the present disclosure.

DETAILED DESCRIPTION

Figure 1:
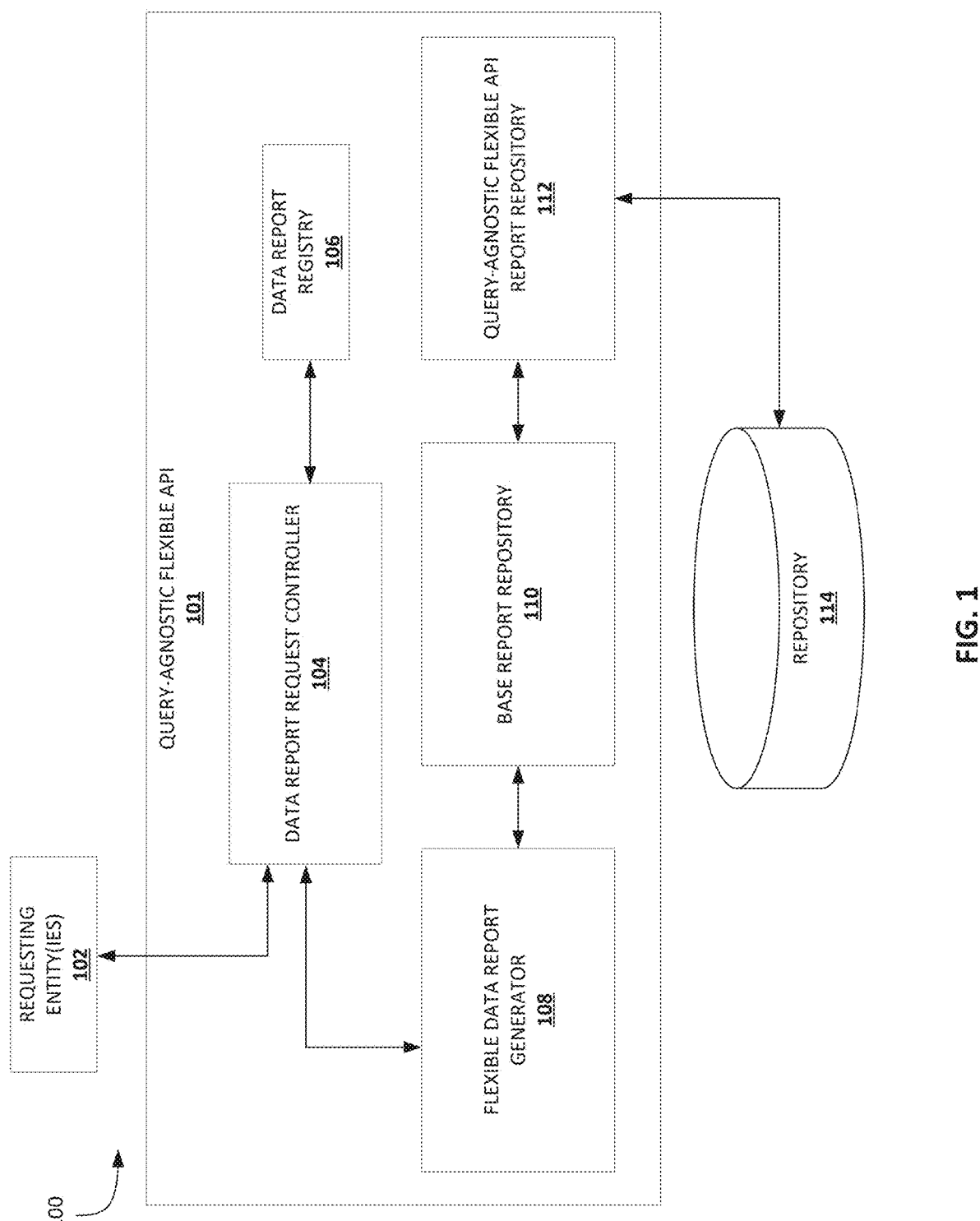
FIG. 1 illustrates an example system environment within which at least some embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

While values for dimensions of various elements may be disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Overview

The present disclosure relates to servicing constrained data report requests by generating and providing constrained data reports.

In the software industry, the need to access a data resource (e.g., a repository) and retrieve and present data to a user in a clear, fast, flexible, and insightful manner is essential. Example embodiments may provide the ability to generate queries (e.g., optimized request-agnostic queries) and present results (e.g., constrained data reports) based on various user preferences (e.g., repository constraints, report constraints) in a manner according to the various techniques described herein that computing systems lacking such techniques cannot. Existing systems do not provide an efficient and easy-to-use API configured to filter columns and rows of a data resource at the time of querying a repository based on user inputs (e.g., repository constraints), provide an easily extendible interface to define data entities from multiple data resources, a flexible data model based framework that provides data insights (e.g., constrained data report), support of customized annotations for special processing of certain data entities, the ability to enrich data from query results with data from other sources in a high performance way (e.g., report enrichment data entities), and/or a flexible method to present query results in a way that gives valuable insights into the business that generated the data.

Certain example embodiments described herein provide field projection, custom filtering, entity mapping, an entity repository, data aggregation, and report enrichment. Accordingly, example embodiments described herein enable flexible, low-latency, high-throughput, and easily extendible data retrieval and presentation from repositories based on multi-dimensional user preferences. Additionally, example embodiments described herein support customized annotation for special processing of certain entities and enabling the application of uniform processes across all data models while still providing special treatment to certain entities. Example embodiments described herein may be applied to any performance intensive Java based application that need to access large-scale repositories to deliver insight into data. Combined, the system and embodiments disclosed herein enable a wholistic experience for flexible, low-latency, and high-throughput data gathering, transformation, enrichment, and presentation.

Example embodiments described herein use an object-relational mapping framework to map object data types (e.g., java object data types) to specific query language data types (e.g., Structured Query Language (SQL) data types) and repository tables and execute queries against repositories. The query-agnostic flexible API described herein may extend a base API by creating an additional interface that leverages overloaded methods (e.g., overloaded findAll( ) methods) which accept additional parameters including, but not limited to, group by specifications and dynamic projection, in addition to the base API's specification. This enables embodiments of the present disclosure to provide users the ability to filter columns or rows at the time of querying, thereby improving functionality and efficiency while reducing the consumption of computing resources. Additionally, if a user wants to define a new data resource, the user simply may define the new data resource in a new repository (e.g., a new Java class), reference the new repository in a new interface for the data resource that extends from the query-agnostic flexible API report repository with customized overloaded methods, associate the new repository with a constrained data report model, and call the customized overloaded methods in the constrained data report model. In doing so, the user may query the data resource with dynamic projection, user-defined filter specification, user-defined aggregation specification, pagination, and/or the like, to retrieve query results without using any hard-coded query language (e.g., SQL).

Example embodiments described herein provide improved efficiency and latency for servicing requests to query repositories. By filtering columns and/or rows at the time of querying, the query-agnostic flexible API described herein may service requests in sub-second time intervals (e.g., 20 requests per second, 40 requests per second, or 60 requests per second) thereby providing improved end-user experiences (e.g., via low latency data retrieval for applications) and performance for requesting entities (e.g., via low latency and reduced computing resource consumption).

Example embodiments described herein provide improvements for servicing requests to query repositories in cases where repositories have stringent security measures in place. Some repositories require APIs and/or authentication information in order to access data stored therein. In such cases, the efficiency and speed of an API used to access such repositories may be a limiting factor in an application, computing system, and/or the like. The query-agnostic flexible API described herein may provide and/or receive authentication information within requests to, for example, verify the identity of requesting entities, enabling the query-agnostic flexible API to service requests made to repositories storing sensitive data that require APIs and/or authentication information for access. Accordingly, the query-agnostic flexible API may provide functionalities such as servicing requests to query repositories in a fast and secure manner via the various techniques described herein in a manner that computing systems lacking such techniques cannot.

Some example embodiments described herein build upon the Java Persistence API (JPA) specification to provide these functionalities in addition to the base functionality of JPA. JPA is widely used by Java based applications to query repositories. JPA provides standardization methods to access data, but fails to provide an efficient and easy-to-use way to filter columns or rows at the time of querying a repository based on user inputs, an easily extendible way to define entities from newly created data resources, a flexible framework that provides different types of data insights based on ever-evolving business needs, any support for special processing of certain data entities, the ability to enrich data from query results with data from other sources in a high-performance way, and/or a flexible method to present the results in a way that gives valuable insights into the business that generated the data. In an example, techniques described herein may be used to provide a data presentation via a data-model-based framework. For instance, a data report may be generated and presented to a customer as a spreadsheet (e.g., a file having an XLSX format). The data report may include a plurality of data formats and any of the data types and values described herein. For example, the data report may be formatted with each row being one day and including various metrics therein (e.g., in each column). The system may automatically provide a row that, for each cell in the row, sums up all the rows in that same column or facilitates various other data manipulations (e.g., providing a new row, providing a new column, summing all the rows in column, etc.).

JPA only supports non-user customizable filtering and limited static projection. With only static projection, a user is forced to hard-code data models and use such hard-coded data models for all queries. If a user only wants to retrieve select columns from a table of a repository, an API lacking the techniques of the present disclosure will still need to query the table for all columns, causing extra strain on the repository and the application of the user. Additionally, JPA does not support user defined filtering which may be used to limit the rows returned from a query of a repository, adding further to the strains caused by JPA. Additionally, JPA does not allow a user to aggregate data by any applicable columns in a repository for data analysis purposes. These deficiencies of JPA are crucial barriers to overcome in providing valuable business insights into a set of data in a large-scale environment with rapidly changing user needs. For example, these deficiencies of JPA cause performance degradation in large-scale applications and repositories, creates overhead in development work, and makes results less valuable to users.

In contrast, example embodiments described herein may filter columns and/or rows for selection at the time of querying. This, in turn, reduces network traffic and unnecessary usage of computing resources thereby saving bandwidth and computing resources used in retrieving, receiving, and processing data. Example embodiments may therefore provide additional improvements to the speed and performance of mobile applications by servicing requests made to the query-agnostic flexible API in efficient and sub-second time intervals (e.g., 40 requests per second), thereby reducing latency, server loads, and data costs, and improving user experience.

Definitions

As used herein, the terms "data," "content," "information," "resource," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to particular hardware configured to perform the functions associated with the particular circuitry as described herein. In some embodiments, circuitry may be used as part of (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," refers to a physical storage medium (e.g., volatile, or non-volatile memory device), and may be differentiated from a "computer-readable transmission medium," which refers to an electromagnetic signal.

As used herein, the terms "data structure," "data entity," "data object," or "data set" may be used interchangeably to refer to data capable of being transmitted, received, and/or stored.

As used herein, the term "access" refers to the ability to receive, retrieve, view, make available, make use of, or the like, various data associated with embodiments described herein.

As used herein, the term "repository," "database," and/or the like, may be used to interchangeably refer to a computing location associated with a system where data is stored, accessed, modified, and otherwise maintained by the system. A repository may be used to store data in association with a data storage protocol and/or a query language. In certain embodiments, a repository may embody a data storage device or devices, a separate database server or servers, or as a combination of data storage devices and separate database servers. Further, in some embodiments, a repository may be embodied as a distributed repository such that some of the stored data is stored centrally in a location within the repository and other data stored in a single remote location or a plurality of remote locations. Alternatively, in some embodiments, a repository may be distributed over a plurality of remote storage locations only such as in a cloud storage environment.

In various embodiments, a repository may be used to store data associated with one or more requesting entities. A repository may be accessed in order to facilitate at least one operation associated with a constrained data report request, such as, for example, one or more data operations indicated by repository constraints of a constrained data report request. A repository may facilitate storage of various data, including business data, user profile data, historical data, and/or the like, defined by a data storage protocol, accessible via an API, associated with a query language, and/or the like.

As used herein, the term "application program interface," or "API" refers to software configured to enable the exchange of data between computer program products, components, repositories, and/or the like. For example, an API may be a standardized software intermediary associated with one or more hardware and/or software components configured to perform one or more functions of the API such as receiving and/or providing data (e.g., via requests and/or responses). An API may be associated with one or more standards, protocols, definitions, specifications, and/or the like, that define how communications facilitated by the API may be performed and/or how the API may be configured.

As used herein, the term "query-agnostic flexible API" refers to an API configured to provide flexible create, read, update, and/or delete (CRUD) capabilities for a requesting entity by generating and executing dynamic queries based on parameters specified by the requesting entity. For example, the query-agnostic flexible API may provide a framework of program code, rules, and/or logic that collectively define and/or facilitate how a constrained data report request comprising parameters (e.g., repository constraints, report constraints, etc.) specified by a requesting entity may be received and transformed into an optimized request-agnostic query to perform one or more CRUD operations at a repository and provide a constrained data report to the requesting entity. The constrained data report request from the requesting entity is not required to comprise specific query language syntax.

Example embodiments described herein for providing a constrained data report in response to a constrained data report request may be performed and/or defined by the query-agnostic flexible API. For example, the query-agnostic flexible API may be configured to receive and parse through constrained data report requests to identify, extract, and/or map parameters and/or other data (e.g., report constraints, repository constraints) used to define specific data for CRUD operations. Additionally or alternatively, the query-agnostic flexible API may retrieve and/or generate data in one or more intermediate steps such as optimized request-agnostic results sets, report enrichment data entities, constrained data report models, and/or the like.

In various embodiments, the query-agnostic flexible API may provide and/or facilitate entity mapping. For example, the query-agnostic flexible API and/or one or more components associated with the query-agnostic flexible API (e.g., the base report repository, the query-agnostic flexible API report repository) may define how objects of a program (e.g., Java data objects) are mapped to data of a resource at a repository (e.g., tables, columns, rows, etc.). Additionally, in some embodiments, the query-agnostic flexible API may provide and/or facilitate entity mapping for new data resources. For example, a user may define a new data resource, reference the new data resource in an interface that extends from the query-agnostic flexible API report repository, associate the new data resource with a constrained data report model, and call the customized overloaded method of the query-agnostic flexible API report repository in the constrained data report model. In this manner, a new data resource may be defined and queried with flexible user-defined parameters via the query-agnostic flexible API.

In certain embodiments, the query-agnostic flexible API may be associated with a specification defining how to use the query-agnostic flexible API. For example, the specification may define syntax, rules, and/or the like, used to configure constrained data report requests to include various repository constraints, report constraints, and/or the like. Additionally or alternatively, the query-agnostic flexible API may be associated with an interface configured to allow a requesting entity to configure a constrained data report request without necessarily needing to generate the constrained data report request. For example, a requesting entity may provide parameters and values (e.g., received via user input) as inputs to an associated interface of the query-agnostic flexible API, and the query-agnostic flexible API may automatically generate a corresponding constrained data report request accordingly.

In some embodiments, the query-agnostic flexible API may be an extension of another API. For example, the query-agnostic flexible API may extend a base API to provide additional flexibility and functionality beyond what the base API provides. In some examples, the query-agnostic flexible API may be an extension of JPA, or any other API. For example, the query-agnostic flexible API may provide additional and/or modified, calls, responses, parameters, methods, and/or the like of a base API. In various examples, the query-agnostic flexible API may provide an implementation of a base API that provides new functionalities to the base API, including but not limited to, field projection, custom filtering, entity mapping, an entity repository, data aggregation, and report enrichment. Additionally, the query-agnostic flexible API may provide an implementation of a base API that provides improved performance of the base API (e.g., lower latency via sub-second time intervals for servicing constrained data report request, higher throughput via servicing, for example, 40 constrained data report request per second), for example, by generating flexible queries (e.g., field projection, custom filtering). Such a system may be secure and unable to be brute forced or manually accessed due to the use of the API, the speed of the system, and/or other security features implemented therewith (e.g., single or multifactor authentication).

In some embodiments, the query-agnostic flexible API and/or one or more components associated with the query-agnostic flexible API may be configured in accordance with the Representational State Transfer (REST) architecture. In certain examples, the query-agnostic flexible API may include or otherwise be associated with various components configured to perform one or more operations in association with the query-agnostic flexible API including, but not limited to, one or more data report request controllers, flexible data report generators, data report registries, base report repositories, query-agnostic flexible API report repositories, and/or the like. In some examples, the query-agnostic flexible API may be configured to work with one or more external components and/or other APIs to perform and/or facilitate various operations described herein.

As used herein, the term "requesting entity" refers to an entity providing requests to the query-agnostic flexible API. In various examples, a requesting entity may be a computer, laptop, tablet, smartphone, application, web application, mobile application, desktop application, server application, web service, microservice, automated bot, third-party extension, data analytics tool, machine learning model, program, program code, program script, and/or the like.

In some embodiments, a requesting entity may require access to particular data stored within a repository, database, and/or the like. In such an embodiment, the requesting entity may request a constrained data report in order to receive the particular data. Accordingly, the requesting entity may generate a constrained data report request to retrieve the particular data by specifying one or more repository constraints, report constraints, and/or the like, within the constrained data report request. The requesting entity may generate and/or initiate the constrained data report request via the query-agnostic flexible API, a component of the query-agnostic flexible API, a component associated with the query-agnostic flexible API, and/or the like. In response, the requesting entity may receive the requested constrained data report from the query-agnostic flexible API, a component of the query-agnostic flexible API, a component associated with the query-agnostic flexible API, and/or the like.

As used herein, the term "constrained data report request" refers to a data entity that may be generated, initiated, and/or otherwise provided by a requesting entity to the query-agnostic flexible API to cause one or more CRUD operations at a repository. For example, a constrained data report request may be an API call, message, request, and/or the like associated with the query-agnostic flexible API. In some examples, a constrained data report request, portions thereof, and/or data derivative thereof may be provided to various components of, or various components associated with, the query-agnostic flexible API, such as a data report request controller, a flexible data report generator, a data report registry, a report repository, and/or the like.

In various embodiments, a constrained data report request may include or otherwise be associated with a resource endpoint (e.g., a uniform resource locator (URL), uniform resource identifier (URI), uniform resource name (URN), etc.), an endpoint action (e.g., HTTP methods such as GET, POST, PUT, DELETE, etc.), report constraints (e.g., key value pairs to provide additional information about the constrained data report request such as Content-Type, Authorization, Accept, Allow, Status, etc.), repository constraints (e.g., query parameters), any other query portions (e.g., body parameters, path parameters, matrix parameters, etc.), and/or the like. In this manner, a constrained data report request may specify or be used to specify particular data, a particular format, and/or other parameters associated with the set of data that should be created, read, updated, and/or deleted in response to the constrained data report request.

In some embodiments, a constrained data report request may be generated based on a specification associated with the query-agnostic flexible API. For example, the query-agnostic flexible API may be associated with a specification that defines how constrained data report requests may be constructed, formatted, used, and/or the like, to perform various CRUD operations. Accordingly, syntax defined by the specification may be used to generate a constrained data report request. Additionally or alternatively, the query-agnostic flexible API may be configured to generate a constrained data report request automatically based on parameters and/or values specified by a user. For example, user inputs may be received by the query-agnostic flexible API and used to automatically generate a constrained data report request.

In certain embodiments, the query-agnostic flexible API may generate specific and dynamic queries comprising query language syntax (e.g., optimized request-agnostic queries) based on constrained data report requests. However, the constrained data report requests do not necessarily need to comprise any such query language syntax.

As used herein, the term "resource endpoint" refers to a data entity that identifies a data resource for a constrained data report request. By way of example, a resource endpoint may include or otherwise be associated with a URL, URI, URN, and/or the like. A resource endpoint may, for example, be included within or otherwise associated with a constrained data report request. In various examples, a resource endpoint may be used to route to a specific resource such as a repository and/or portion thereof. For example, a resource endpoint may be a unique identifier associated with a specific table containing data associated with a constrained data report request.

In some embodiments, a resource endpoint may comprise a string that identifies a particular data resource associated with a particular service for querying. For example, Company A may own a domain, "CompanyA.com" and provide an API to query their sales data stored in a table named "Sales." In such an example, a resource endpoint used to route to and query the Sales table of Company A may be https://api.CompanyA.com/Sales/{ } where { } may include one or more repository constraints.

As used herein, the term "repository constraint" refers to a data entity that defines one or more query parameters of a constrained data report request for generating a constrained data report. A repository constraint may be, for example, a query parameter and define criteria configured to identify, select, and/or otherwise restrict data associated with one or more CRUD operations of a constrained data report request. In some examples, a repository constraint may be used to define which data an optimized request-agnostic results set may comprise. In certain examples, repository constraints may be used to enable field projection, custom filtering, data aggregation, report enrichment, and/or the like. In some examples, a repository constraint may be used to define a regular expression used for querying based on particular syntax rules (e.g., defined patterns of strings, digits, characters, etc.).

In some embodiments, field projection may be used to select specified fields of a resource (e.g., columns of a table) stored at a repository. For example, instead of retrieving all fields from a document or table, one or more repository constraints defining one or more field projections may be used to specify particular fields to include or exclude from a query. Example embodiments may use one or more repository constraints defining one or more field projections such that fields (e.g., columns of a table) may be filtered at the time of querying.

In certain embodiments, custom filtering may be used to select specified rows of a resource (e.g., rows of a table) stored at a repository. For example, instead of retrieving all rows from a document or table, one or more repository constraints defining one or more custom filters may be used to specify particular rows to include or exclude from a query. Example embodiments may use one or more repository constraints defining one or more custom filters such that rows of a resource (e.g., a table) may be filtered at the time of querying.

In various embodiments, data aggregation may be used to combine, substitute, and/or organize two or more fields and/or rows of a resource stored at a repository. For example, instead of retrieving all individual rows of a field from a document or table, one or more repository constraints defining one or more data aggregations may be used to combine, substitute, and/or organize the individual rows, such as a summation of all of the rows, a count of how many rows there are, an average of all of the rows, a minimum of all of the rows, a maximum of all of the rows, a sorted list of the rows grouped by a parameter, a sorted list of the rows ordered by a parameter, and/or the like.

Various examples of repository constraints include, but are not limited to, filtering parameters used to retrieve data based on specific values, sorting parameters used to sort results in a specific order, pagination parameters to limit a number of results returned and/or navigate large data sets, search parameters used to identify specific terms within data, field parameters used to specify fields for inclusion in results, range parameters used to specify ranges of values for results, date parameters used to specify date ranges for results, regular expressions used to match syntax rules of results, custom parameters defined by the query-agnostic flexible API, and/or the like.

In certain embodiments, the query-agnostic flexible API may generate specific and dynamic queries comprising query language syntax (e.g., optimized request-agnostic queries) based on repository constraints. However, the repository constraints do not necessarily need to comprise any such query language syntax.

As used herein, the term "report constraint" refers to a data entity that defines one or more configuration parameters of a constrained data report request for generating a constrained data report. A report constraint may be, for example, a header parameter and define a data format, data transformation, file condition, and/or the like, configured to manipulate the data of a constrained data report. In some examples, a report constraint may be used to manipulate and transform data of a constrained data report model into a constrained data report.

Various examples of report constraints include, but are not limited to, an accept type used to specify a format for results, content-disposition used to specify if results should be returned in line or as an attachment, authorization used to specify credentials for security (e.g., to access a repository having one or more security and/or authentication measures), cache-control used to specify caching mechanism behavior, custom parameters defined by the query-agnostic flexible API, and/or the like. In some examples a report constraint may specify or be used to specify a format for a constrained data report provided in response to a constrained data report request such as, for example, Comma Separated Values (.csv), MICROSOFT EXCEL Spreadsheet (.xls, .xlsx), JavaScript Object Notation File (.json), extensible Markup Language File (.xml), Plain Text File (.txt), and/or the like. In various examples, report constraints may modify one or more values and/or formats of data for a constrained data report such as, for example, changing values to a particular currency format (e.g., as dollars, euros, etc.), changing values to a particular date format, sorting values, merging values, grouping values, removing duplicate values, generating and/or adding metadata, changing values based on a unit conversion, and/or the like.

As used herein, the term "endpoint action" refers to a data entity that defines a data operation of a constrained data report request to be performed at a resource endpoint. By way of example, an endpoint action may define a CRUD operation. Examples of an endpoint action include, but are not limited to, HTTP operations such as GET, POST, PUT, DELETE, and/or the like. In some examples, an endpoint action associated with a constrained data report request may be a GET operation used to indicate the retrieval of data, a PUT operation used to indicate the creation of data, a DELETE operation used to indicate the deletion of data, and/or the like.

As used herein, the term "constrained data report" refers to a data entity generated by the query-agnostic flexible API and comprising data requested by a constrained data report request. A constrained data report may include or otherwise be associated with, for example, an optimized request-agnostic results set, object-oriented data entity model, constrained data report model, constrained data report request, data report registry, report constraints, portions thereof, data derivative thereof, and/or the like. In some examples, a constrained data report may define or be defined by the contents, structure, design, format, and/or the like, of the data contained therein.

In various embodiments, a constrained data report may be generated based on a constrained data report model. For example, a constrained data report may be generated by modifying a constrained data report model according to one or more report constraints. In some examples, the data of a constrained data report model may be transformed, processed, organized, and/or otherwise modified in accordance with one or more report constraints to generate a constrained data report. Alternatively, in certain examples, a constrained data report may be the same as a constrained data report model. In some examples, a constrained data report may provide a specialized view of data being requested by a constrained data report request. In various examples, a constrained data report may be provided to a requesting entity in response to a constrained data report request. In certain examples, a constrained data report may be generated by a data report request controller.

As used herein, the term "constrained data report model" refers to an intermediate data entity comprising data retrieved in response to a constrained data report request. A constrained data report model may, for example, include or otherwise be associated with an optimized request-agnostic results set, object-oriented data entity model, report enrichment data entities, constrained data report, portions thereof, data derivative thereof, and/or the like. In some examples, a constrained data report model may define or be defined by the content, structure, design, format, and/or the like, of the data contained therein.

In certain embodiments, a constrained data report model may be generated based on an object-oriented data entity model and/or report enrichment data entities. For example, a constrained data report model may be generated by projecting, transforming, processing, organizing, and/or otherwise modifying the data of an object-oriented data entity model and/or report enrichment data entities. In some examples, a constrained data report model may provide a specialized structure and/or combination of data being requested by a constrained data report request, portions thereof, and/or data derivative thereof. In various examples, a constrained data report model may be provided to a data report request controller to generate a constrained data report. In certain examples, a constrained data report model may be generated by a flexible data report generator.

As used herein, the term "object-oriented data entity model" refers to an intermediate data entity of an object-oriented programming language comprising data retrieved in response to a constrained data report request. An object-oriented data entity model may include or otherwise be associated with data entities, an optimized request-agnostic results set, a constrained data report model, a constrained data report request, portions thereof, data derivative thereof, and/or the like. In various examples, an object-oriented data entity model may define, or be defined by, the contents, structure, design, format, and/or the like, of the data contained therein.

In some embodiments, an object-oriented data entity model may map objects of an object-oriented programming language to the data of a repository such as, for example, tables, columns, and/or the like. An object-oriented data entity model may be configured to store data retrieved from a repository in response to a constrained data report request. For example, an object-oriented data entity model may comprise an optimized request-agnostic results set. In various examples, an object-oriented data entity model may be provided to a flexible data report generator, projected onto a constrained data report model, and/or the like. In some examples, an object-oriented data entity model may be defined by and/or generated by a report repository such as a base report repository and/or query-agnostic flexible API report repository.

As used herein, the term "report enrichment data entity" refers to a special processing data entity generated in response to a constrained data report request. For example, report enrichment data entities may comprise data requested in a constrained data report request that cannot be directly queried from a repository. In some examples, a report enrichment data entity may be based on data queried from the repository, data from an alternative resource, and/or the like. Report enrichment data entities may enable constrained data report requests to request data entities that are not directly available in a repository but that may be generated in a post-query operation. In some examples, report enrichment data entities may be generated by constrained data report models, flexible data report generators, and/or flexible data report calculators, and included within constrained data report models. In various examples, report enrichment data entities may be generated based on one or more data entities of an object-oriented data entity model. In some examples, a report enrichment data entity may be identified by an annotation for special processing of a data entity.

As used herein, the term "optimized request-agnostic results set" refers to a data set comprising data retrieved from a repository. By way of example, an optimized request-agnostic results set may be retrieved by querying a repository using an optimized request-agnostic query configured to define the optimized request-agnostic results set. For example, an optimized request-agnostic query may be generated in response to a constrained data report request and provided to a repository to retrieve an optimized request-agnostic results set. In some examples, an optimized request-agnostic results set may be included within and/or otherwise associated with object-oriented data entity models, data entities, report enrichment data entities, constrained data report models, constrained data reports, portions thereof, data derivative thereof, and/or the like.

As used herein, the term "optimized request-agnostic query" refers to a data entity configured to retrieve an optimized request-agnostic results set. An optimized request-agnostic query may, for example, comprise data (e.g., one or more query-specific instructions) configured to, when applied to a repository, cause the retrieval of specific data according to the optimized request-agnostic query. In various examples, an optimized request-agnostic query may comprise and/or optimize one or more query-specific instructions according to a respective query language, repository, and/or the like. By way of example, an optimized request-agnostic query may comprise one or more Structured Query Language (SQL) queries, Hibernate Query Language (HQL) queries, XQuery queries, Cypher queries, or any other query language syntax. In various examples, an optimized request-agnostic query may be associated with one or more constrained data report requests, repository constraints, query-specific scripts, query-specific instructions, portions thereof, data derivative thereof, and/or the like.

As used herein, the term "query-specific script" refers to a data entity configured to generate query-specific instructions from repository constraints. By way of example, a query-specific script may be a retrievable program method comprising one or more lines of executable program code configured to receive repository constraints and/or data derivative thereof as parameters and, when executed, programmatically generate query-specific instructions. In some examples, query-specific scripts may be defined by, stored within, and/or otherwise associated with a report repository such as the base report repository and/or the query-agnostic flexible API report repository. Additionally or alternatively, a query-specific script may be associated with object-oriented data entity models. For example, a query-specific script may be configured to map data retrieved from a repository (e.g., an optimized request-agnostic results set) to an object-oriented data entity model.

As used herein, the term "query-specific instruction" refers to a data entity configured to manipulate and/or cause the manipulation of specific data within a repository. By way of example, query-specific instructions may be associated with a query language such as, for example, SQL, HQL, XQuery, Cypher, and/or the like. In various examples, one or more query-specific instructions may be generated by one or more query-specific scripts. In some examples, one or more query-specific instructions may be used to generate one or more optimized request-agnostic queries.

As used herein, the term "data report request controller" refers to a data entity and/or a component of the query-agnostic flexible API. In certain examples, a data report request controller may comprise one or more classes of a programming language. A data report request controller may include, for example, program code configured to receive, analyze, process, modify, provide, and/or the like, one or more data entities such as, for example, constrained data report requests, constrained data report models, and constrained data reports.

In various embodiments, a data report request controller may comprise one or more data report request controllers specialized for different tasks. For example, a data report request controller may comprise a data report request controller specialized for file services (e.g., receiving constrained data report requests, applying report constraints, providing constrained data reports), a data report request controller specialized for data report services (e.g., communicating with the flexible data report generator, generating the constrained data report), and/or the like. In such examples, the one or more specialized data report request controllers may collectively perform the actions of the data report request controller. In certain examples, a data report request controller specialized for file services may be configured to perform operations associated with file management such as routing, receiving, and/or providing files (e.g., transmitting constrained data reports to requesting entities), and/or the like. In some examples, a data report request controller specialized for data report services may be configured to perform operations associated with generating and/or managing constrained data reports.

In some embodiments, a data report request controller may be configured to receive a constrained data report request, analyze the constrained data report request, and perform one or more actions based on the analysis. In various examples, a data report request controller may parse a constrained data report request to identify one or more query portions of the constrained data report request such as, for example, resource endpoints, repository constraints, report constraints, endpoint actions, and/or the like. In some examples, a data report request controller may provide a constrained data report request, portions thereof, and/or data derivative thereof, to a flexible data report generator.

In certain embodiments, a data report request controller may be associated with a data report registry and configured to use the data report registry to identify a flexible data report generator associated with a constrained data report request. In various examples, a data report registry may define one or more criteria associated with and/or used to identify a flexible data report generator that may be used to generate a constrained data report model in response to a constrained data report request. For example, the data report registry may identify a flexible data report generator for a constrained data report based on one or more of the resource endpoints, repository constraints, report constraints, endpoint actions, and/or the like identified by the data report request controller.

In various embodiments, a data report request controller may receive a constrained data report model from a flexible data report generator. In various examples, a data report request controller may generate a constrained data report from a constrained data report model. For example, a flexible data report generator may modify a constrained data report model according to one or more report constraints identified from a constrained data report request to generate a constrained data report. Additionally or alternatively, a data report request controller may be configured to provide constrained data reports, for example, to a requesting entity. For example, a data report request controller may receive a constrained data report model from a flexible data report generator, generate a constrained data report based at least on the constrained data report model, and provide the constrained data report to a requesting entity in response to a constrained data report request.

As used herein, the term "flexible data report generator" refers to a data entity and/or a component of the query-agnostic flexible API. In certain examples, a flexible data report generator may comprise one or more classes of a programming language. A flexible data report generator may include, for example, program code configured to receive, analyze, process, modify, provide, and/or the like, one or more data entities such as, for example, constrained data report models, object-oriented data entity models, report enrichment data entities, constrained data report requests, and/or the like.

In some embodiments, a flexible data report generator may be configured to receive a constrained data report request, portions thereof, data derivative thereof, and/or the like from a constrained data report request controller. Additionally or alternatively, a flexible data report generator may provide a constrained data report request, portions thereof, data derivative thereof, and/or the like to a report repository such as, for example, the base report repository and/or the query-agnostic flexible API report repository. In various examples, a flexible data report generator may receive data from a report repository and/or an object-oriented data entity model. For example, a flexible data report generator may provide a constrained data report request, repository constraints, and/or the like, to a report repository and receive an object-oriented data entity model or one or more data entities from an object-oriented data entity model in response.

In various embodiments, the flexible data report generator may map, extract, copy, and/or the like, the one or more data entities of the object-oriented data entity model into the constrained data report model. Additionally or alternatively, the flexible data report generator may generate one or more report enrichment data entities from one or more data entities of the object-oriented data entity model or another data resource and generate the constrained data report model based additionally on the one or more report enrichment data entities. For example, a constrained data report request may request data not directly available from a repository (e.g., a composite value). In such an example, the flexible data report generator may be configured to generate report enrichment data entities based on one or more other data resources. In some examples, customized annotations may be used to identify data entities for custom calculations and generating report enrichment data entities. In certain examples, the flexible data report generator may use a flexible data report calculator to generate report enrichment data entities. For example, the flexible data report calculator may comprise one or more custom calculations used for generating report enrichment data entities.

As used herein, the term "report repository" refers to a repository configured to store, manage, and/or access program code associated with object-oriented data entity models, query-specific scripts, query-specific instructions, optimized request-agnostic queries, and/or the like. For example, a report repository may comprise program code, classes, methods, and/or the like that define and/or generate object-oriented data entity models, query-specific scripts, query-specific instructions, optimized request-agnostic queries, and/or the like. In various examples, a report repository may map classes, methods, objects of an object-oriented programming language, and/or the like, to resources of a repository (e.g., tables, columns). In some examples, a report repository may provide an entity repository comprising one or more mappings between data objects of a programming language (e.g., Java data objects) and data of a repository (e.g., a relational database).

In some embodiments, a report repository may map, or be used to map, data retrieved from a repository to one or more objects of an object-oriented programming language; data from a constrained data report request to one or more classes and/or methods of the report repository; various data entities to queries of a query language, and/or the like. For example, a report repository may be configured to generate object-oriented data entity models based on optimized request-agnostic results sets; generate query-specific scripts based on repository constraints; generate query-specific instructions from query-specific scripts, repository constraints, and/or the like; and generate optimized request-agnostic queries based on query-specific scripts, repository constraints, and/or the like.

In some embodiments, a report repository may be extended by another report repository to provide additional and/or custom functionality. For example, the base report repository may be extended by the query-agnostic flexible API report repository. In some examples, the base report repository may be the JPA report repository and the query-agnostic flexible API report repository may be an extension of the JPA report repository. The query-agnostic flexible API report repository may extend the JPA report repository to provide additional functionality including, but not limited to, field projection, custom filtering, entity mapping, an entity repository, data aggregation, and report enrichment, and/or the like. In some examples, the query-agnostic flexible API report repository may define overloaded methods that enable dynamic projection, custom filtering, data aggregation, and/or the like. For example, overloaded findAll ( ) methods may be defined by the query-agnostic flexible API report repository that accept parameters used to define field projection (e.g., user-provided column names), filter specifications (e.g., user defined rows), aggregation specification (e.g., user defined data aggregation), pagination, and/or the like, for querying.

System Architecture

Embodiments of the present disclosure may be implemented in various ways, including as computer program products that comprise articles of manufacture, as hardware, including circuitry, configured to perform one or more functions, and/or as combinations of specific hardware and computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as one or more methods, apparatuses, systems, computing devices (e.g., user devices, servers, etc.), computing entities, and/or the like. As such, embodiments of the present disclosure may take the form of an apparatus, system, computing device, computing entity, and/or the like executing instructions stored on one or more computer-readable storage mediums (e.g., via the aforementioned software components and computer program products) to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, and other example visualizations. It should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. In embodiments in which specific hardware is described, it is understood that such specific hardware is one example embodiment and may work in conjunction with one or more apparatuses or as a single apparatus or combination of a smaller number of apparatuses consistent with the foregoing according to the various examples described herein. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein.

As shown in FIG. 1, the example system environment 100 includes a query-agnostic flexible API 101, one or more requesting entities 102, and a repository 114. The query-agnostic flexible API 101 includes the data report request controller 104, data report registry 106, flexible data report generator 108, base report repository 110, and query-agnostic flexible API report repository 112. The query-agnostic flexible API 101 may be in communication with one or more of the requesting entities 102 and the repository 114.

It will be understood that while many of the aspects and components presented in FIG. 1 are shown as discrete, separate elements, other configurations may be used in connection with the methods, apparatuses, computer readable media, and computer programs described herein, including configurations that combine, omit, separate, and/ or add aspects and/or components. For example, in some embodiments, the functions of one or more of the illustrated components in FIG. 1 may be performed by a single computing device or by multiple computing devices, which devices may be local or cloud based. It will be appreciated that the various functions performed by two or more of the query-agnostic flexible API 101, the requesting entities 102, and/or the repository 114 may be embodied by a single apparatus, subsystem, or system comprising one or more sets of computing hardware (e.g., processor(s) and memory) configured to perform various functions thereof.

In some embodiments, the query-agnostic flexible API 101 or portions thereof (e.g., one or more components of the query-agnostic flexible API 101) may be configured to provide a platform, such as an API interface for access by a user. In this regard, the API interface may be accessed by a requesting entity 102 via an application installed in the requesting entity 102. Further, the API interface may be accessed by a requesting entity 102 via a web browser, mobile browser application (e.g., a Wireless Application Protocol browser), and/or the like.

In some embodiments, a requesting entity 102 is electronic computing device that may be used by a user for any of a variety of purposes including, but not limited to, one or more of sending and/or receiving signals, storing data, displaying data, viewing data, or initiating request(s). For example, the requesting entity 102 may be capable of, but not limited to, one or more of displaying data on the screen of the requesting entity 102, receiving user input that triggers data retrieval tasks, determining and/or receiving data that triggers dynamic update of a screen of the requesting entity 102 and/or information displayed on the screen of the requesting entity 102, or delivering representations of a constrained data report (or portions thereof) to a user.

A requesting entity 102 may include computer hardware and/or software configured to perform one or more functionalities associated with the requesting entity 102. In some embodiments, the requesting entity 102 may be a mobile device. The mobile device may be a user device that is capable of being held and transported by a user. Example mobile devices include, but not limited to, smart phones, tablet computers, laptop computers, wearables, laptop computers, or the like.

The query-agnostic flexible API 101 may include the data report request controller 104, data report registry 106, flexible data report generator 108, base report repository 110, and query-agnostic flexible API report repository 112. In the illustrated embodiment of FIG. 1, one or more of the data report request controller 104, data report registry 106, flexible data report generator 108, base report repository 110, and query-agnostic flexible API report repository 112 may be configured to facilitate performance of one or more functions of the query-agnostic flexible API 101.

In some embodiments, the functions of one or more of the illustrated components of the query-agnostic flexible API 101 may be performed by a single computing device or by multiple computing devices, which devices may be local or cloud based.

The various functions of the query-agnostic flexible API 101 and system environment 100 may be performed by other arrangements of one or more computing devices and/or computing systems without departing from the scope of the present disclosure. In some embodiments, a computing system may comprise one or more computing devices (e.g., server(s)).

The various components illustrated in the query-agnostic flexible API 101 and system environment 100 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMAX network. Further, a network may include a public network, such as the Internet, a private network, such as an intranet, or combinations thereof, and may utilize a variety of networking protocols now available or later developed including, but not limited to TCP/IP based networking protocols.

In various embodiments, the components depicted in FIG. 1 as being included in the query-agnostic flexible API 101, although not required to be an integral system, may be connected via one or more networks. In some embodiments, one or more networks, programs, components, and/or the like, may be leveraged to communicate with and/or facilitate communication between one or more of the components illustrated in the query-agnostic flexible API 101 and system environment 100.

Example System Operation

The query-agnostic flexible API 101 may be configured to receive constrained data report requests from requesting entities and in response, provide constrained data reports to the requesting entities. The query-agnostic flexible API 101, using the various components described herein, may be configured to generate optimized request-agnostic queries based on the received constrained data report requests, retrieve optimized request-agnostic results sets using the optimized request-agnostic queries, and generate the constrained data reports from the optimized request-agnostic results sets based on the constrained data report requests.

In some embodiments, the query-agnostic flexible API 101 may receive a constrained data report request from a requesting entity 102. The requesting entity 102 may be any computing device configured to send and receive data to and from the query-agnostic flexible API 101. In various examples, a requesting entity 102 may be any application, program, service, computing device, and/or the like capable of transmitting a constrained data report request to the query-agnostic flexible API 101 and receiving a constrained data report from the query-agnostic flexible API 101. In some examples, the requesting entity 102 may be configured to provide a constrained data report request to the query-agnostic flexible API 101 automatically and/or in response to an input from a user of the requesting entity 102. For example, the requesting entity 102 may provide a constrained data report request to the query-agnostic flexible API 101 automatically in response to one or more conditions of a computer program hosted at the requesting entity 102 or in response to an input manually provided by a user of the requesting entity 102.

In various embodiments, the query-agnostic flexible API 101 may be configured to receive constrained data report requests via the data report request controller 104. The data report request controller 104 may be, for example, a computer program component, one or more collections of computer program code, one or more computer program classes, and/or the like, configured to facilitate one or more functionalities of the query-agnostic flexible API 101. In various examples, the data report request controller 104 may be configured to handle one or more operations associated with constrained data report requests and/or constrained data reports. In some examples, the data report request controller 104 may be configured to receive constrained data report requests, analyze the constrained data report requests, and perform one or more actions in response.

In some embodiments, the data report request controller 104 may be communicatively coupled with the data report registry 106 and/or the flexible data report generator 108. In some examples, the data report request controller 104 may provide data to, or otherwise invoke the flexible data report generator 108. For example, the data report request controller 104 may provide constrained data report requests, portions thereof, and/or data derivative thereof, to the flexible data report generator 108. In certain examples, the data report request controller 104 may call the flexible data report generator 108 as a part of servicing a constrained data report request and/or executing the code within the data report request controller 104. For example, the data report request controller 104 may comprise one or more program methods defined by, stored in, or otherwise associated with the flexible data report generator 108. In some examples, the data report request controller 104 may receive a constrained data report model from the flexible data report generator 108. Additionally or alternatively, the data report request controller 104 may be configured to generate constrained data reports and/or provide constrained data reports to requesting entities. For example, the data report request controller 104 may provide a constrained data report to the requesting entity 102. In some examples, the data report request controller 104 may generate a constrained data report based on a constrained data report model and/or one or more report constraints identified within the constrained data report request.

In certain embodiments, the query-agnostic flexible API 101 may be configured to identify a flexible data report generator 108 to further service a constrained data report request. In various examples, the data report request controller 104 may use the data report registry 106 to identify the flexible data report generator 108. In some examples, the data report registry 106 may be configured to map one or more query portions of a constrained data report request to a corresponding flexible data report generator. For example, the data report registry 106 may receive one or more query portions from the data report request controller 104 and map the one or more query portions to the flexible data report generator 108. In various examples, the data report registry 106 may cause the flexible data report generator 108 to be used in further servicing the constrained data report request. For example, the data report registry 106 may provide data identifying the flexible data report generator 108 to the data report request controller 104 and/or otherwise cause the data report request controller 104 to call the flexible data report generator 108. In some examples, the data report registry 106 may identify the flexible data report generator 108 based at least in part on a resource endpoint, or any other query portion of a constrained data report request.

In various embodiments, the query-agnostic flexible API 101 may be configured to generate constrained data report models via the flexible data report generator 108. The flexible data report generator 108 may be, for example, a computer program component, one or more collections of computer program code, one or more computer program classes, and/or the like, configured to facilitate one or more functionalities of the query-agnostic flexible API 101. In various examples, the flexible data report generator 108 may be configured to handle one or more operations associated with constrained data report models.

In some embodiments, the flexible data report generator 108 may be communicatively coupled with the data report request controller 104 and the base report repository 110. In some examples, the flexible data report generator 108 may receive the constrained data report request, portions thereof, and/or data derivative thereof, from the data report request controller 104. In various examples, the flexible data report generator 108 may receive an object-oriented data entity model, portions thereof, and/or data derivative thereof from the base report repository 110. In some examples, an object-oriented data entity model may project its data onto a constrained data report model. Additionally or alternatively, the flexible data report generator 108 may generate one or more report enrichment data entities based at least in part on an object-oriented data entity model, or the data entities thereof, and generate a constrained data report model further based on the report enrichment data entities. In some examples, the flexible data report generator 108 may be configured to use a flexible data report calculator to generate report enrichment data entities. Additionally or alternatively, the flexible data report generator 108 may be configured to provide constrained data report models to the data report request controller 104. In some examples, the flexible data report generator 108 may provide data to, and/or otherwise invoke the base report repository 110. For example, the flexible data report generator 108 may provide the constrained data report request, portions thereof, and/or data derivative thereof to the base report repository 110. In certain examples, the flexible data report generator 108 may call the base report repository 110 as a part of servicing a constrained data report request and/or executing the code within the flexible data report generator 108. For example, the flexible data report generator 108 may comprise one or more program methods defined by, stored in, or otherwise associated with the base report repository 110.

In some embodiments, the query-agnostic flexible API 101 may be configured to generate a plurality of query-specific instructions via the base report repository 110 and/or the query-agnostic flexible API report repository 112. In various examples, the base report repository 110 may define one or more query-specific scripts. For example, the base report repository 110 may store one or more query-specific scripts that, when executed, generate one or more query-specific instructions. The base report repository 110 may be configured to, for example, process data received from the flexible data report generator 108 to further service the constrained data report request. In some examples, the base report repository 110 may receive the constrained data report request, portions thereof, and/or data derivative thereof from the flexible data report generator 108. In various examples, the base report repository 110 may be called by the flexible data report generator 108 to perform one or more processes. For example, the flexible data report generator 108 may call a query-specific script defined by the base report repository 110 causing the base report repository 110 to execute the query-specific script. In various examples, the base report repository 110 may receive one or more parameters (e.g., repository constraints) from the flexible data report generator 108 and use the one or more parameters to, for example, execute the query-specific script.

In various embodiments, the base report repository 110 may be extended by the query-agnostic flexible API report repository 112. Accordingly, in some examples, the base report repository 110 may call the query-agnostic flexible API report repository 112, for example, in a case where a query-specific script of the base report repository 110 is extended by the query-agnostic flexible API report repository 112. In some examples, the base report repository 110 may provide data, such as the data received from the flexible data report generator 108 (e.g., repository constraints), to the query-agnostic flexible API report repository 112. In various examples, the base report repository 110 may receive data from the query-agnostic flexible API report repository 112. For example, the base report repository 110 may receive an optimized request-agnostic results set from the query-agnostic flexible API report repository 112.

In certain embodiments, the query-agnostic flexible API report repository 112 may be configured to process data received from the base report repository 110 to further service a constrained data report request. In some examples, the query-agnostic flexible API report repository 112 may receive the constrained data report request, portions thereof, and/or data derivative thereof from the base report repository 110. In various examples, the query-agnostic flexible API report repository 112 may be called by the base report repository 110 to perform one or more processes. For example, the flexible data report generator 108 may call a query-specific script defined by the base report repository 110 and extended by the query-agnostic flexible API report repository 112 causing the query-agnostic flexible API report repository 112 to execute the query-specific script. In various examples, the query-agnostic flexible API report repository 112 may receive one or more parameters (e.g., repository constraints) from the flexible data report generator 108 and/or base report repository 110 and use the one or more parameters to, for example, execute the query-specific script. In various examples, a plurality of query-specific instructions may be generated for each repository constraint by retrieving a query-specific script and transforming the query-specific script into a query-specific instruction according to the repository constraint.

In some embodiments, the query-agnostic flexible API 101 may be configured to generate an optimized request-agnostic query based on a plurality of query-specific instructions. For example, the query-agnostic flexible API report repository 112 may generate an optimized request-agnostic query based on one or more query-specific instructions generated by the base report repository 110 and/or the query-agnostic flexible API report repository 112. In various examples, the query-agnostic flexible API report repository 112 may query the repository 114 using the optimized request-agnostic query. In some examples, query-agnostic flexible API report repository 112 may receive an optimized request-agnostic results set from the repository 114, for example, in response to querying the repository 114 using the optimized request-agnostic query. In various examples, the query-agnostic flexible API report repository 112 may provide the optimized request-agnostic results set to the base report repository 110.

In various embodiments, the base report repository 110 may generate the object-oriented data entity model. For example, the base report repository 110 may map the optimized request-agnostic results set to data entities of the object-oriented data entity model. In various examples, the base report repository 110 may provide or otherwise make available the object-oriented data entity model and/or the data comprised therein to the flexible data report generator 108. For example, the object-oriented data entity model managed by the base report repository 110 may project its data onto the constrained data report model managed by the flexible data report generator 108.

Example Apparatuses of the Disclosure

Having discussed example systems in accordance with the present disclosure, example apparatuses in accordance with the present disclosure will now be described.

Figure 2:
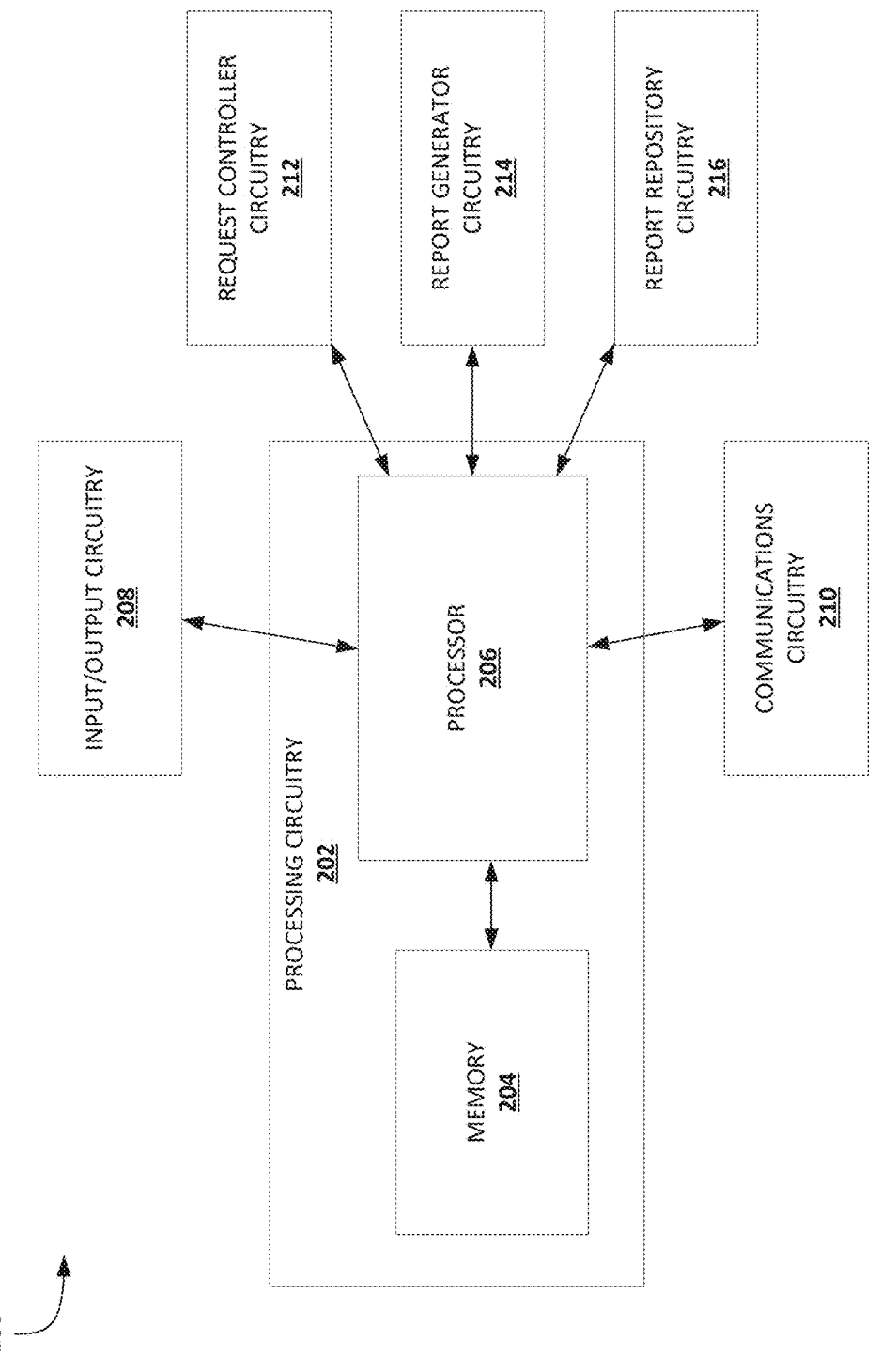
FIG. 2 illustrates a block diagram of an apparatus that may be specifically configured, within which at least some embodiments of the present disclosure may operate.

FIG. 2 illustrates a block diagram of an apparatus 200 in accordance with some example embodiments. For example, in some embodiments, the data report request controller 104, data report registry 106, flexible data report generator 108, base report repository 110, and/or query-agnostic flexible API report repository 112 may be embodied by one or more apparatuses 200. In this regard, in some embodiments, the query-agnostic flexible API 101 or one or more portions (e.g., one or more individual apparatuses) thereof, if embodied in a particular embodiment, may be embodied by one or more apparatuses 200.

In some embodiments, the apparatus 200 may include a processing circuitry 202 as shown in FIG. 2. It should be noted, however, that the components, or elements illustrated in and described with respect to FIG. 2 below may not be mandatory and thus one or more may be omitted in certain embodiments. Additionally, some embodiments, may include further or different components or elements beyond those illustrated in and described with respect to FIG. 2. In some embodiments, the functionality of the query-agnostic flexible API 101, or any subset thereof may be performed by a single apparatus 200 or multiple apparatuses 200. In some embodiments, the apparatus 200 may comprise one or a plurality of physical devices, including distributed, cloud-based, and/or local devices.

Although some components are described with respect to functional limitations, it should be understood that the particular implementations necessarily include the use of particular computing hardware, such as the hardware shown in FIG. 2. It should also be understood that certain of the components described herein may include similar or common hardware. For example, two sets of circuitries for example, may both leverage use of the same processor(s), network interface(s), storage medium(s), and/or the like, to perform their associated functions, such that duplicate hardware is not required for each set of circuitry and a single physical circuitry may be used to perform the functions of multiple circuitries described herein. The use of the term "circuitry" as used herein with respect to components of the apparatuses described herein should therefore be understood to include particular hardware configured to perform the functions associated with the particular circuitry as described herein.

In some embodiments, "circuitry" may include processing circuitry, storage media, network interfaces, input/output devices, and/or the like. In some embodiments, other elements of the apparatus 200 may provide or supplement the functionality of another particular set of circuitry. For example, the processor 206 in some embodiments provides processing functionality to any of the sets of circuitries, the memory 204 provides storage functionality to any of the sets of circuitry, the communications circuitry 210 provide network interface functionality to any of the sets of circuitry, and/or the like.

The apparatus 200 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application, and function execution, and/or other processing and management services according to one or more example embodiments. In some embodiments, the apparatus 200 or a portion(s) or component(s) thereof, such as the processing circuitry 202, may be embodied as or comprise a chip or chip set. In other words, apparatus 200 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (and/or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208) and/or a communications circuitry 210. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, and/or one or more remote or "cloud" processor(s) external to the apparatus 200.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the apparatus 200 to carry out various functions in accordance with one or more example embodiments. For example, the memory 204 may be configured to buffer input data for processing by the processor 206. Additionally or alternatively, the memory 204 may be configured to store instructions for execution by the processor 206. The memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processors 206, input/output circuitry 208, and/or communications circuitry 210, via a bus(es) for passing information among components of the apparatus 200.

The input/output circuitry 208 may provide output to the user or an intermediary device and, in some embodiments, may receive one or more indication(s) of user input. In some embodiments, the input/output circuitry 208 is in communication with processor 206 to provide such functionality. The input/output circuitry 208 may include one or more user interface(s) and/or include a display that may comprise the user interface(s) rendered as a web user interface, an application interface, and/or the like, to the display of a requesting entity, a backend system, or the like. The input/output circuitry 208 may be in communication with the processing circuitry 202 to receive an indication of a user input at the user interface and/or to provide an audible, visual, mechanical, or other output to the user. As such, the input/output circuitry 208 may include, for example, a keyboard, a mouse, a joystick, a display, a touch screen display, a microphone, a speaker, and/or other input/output mechanisms. As such, the input/output circuitry 208 may, in some example embodiments, provide means for a user to access and interact with the apparatus 200. The processor 206 and/or input/output circuitry 208 comprising or otherwise interacting with the processor 206 may be configured to control one or more functions of one or more user interface elements through computer program instructions (e.g., software and/or firmware) stored on a memory accessible to the processor 206 (e.g., stored on memory 204, and/or the like).

The communications circuitry 210 may include one or more interface mechanisms for enabling communication with other devices and/or networks. In some cases, the communications circuitry 210 may be any means such as a device or circuitry embodied in either hardware, or a combination of hardware and software that is configured to receive and/or transmit data from/to a network and/or any other device or module in communication with the processing circuitry 202. The communications circuitry 210 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

In some embodiments, the apparatus 200 may include a request controller circuitry 212 which may include hardware components, software components, and/or a combination thereof configured to, with the processing circuitry 202, input/output circuitry 208 and/or communications circuitry 210, perform one or more functions associated with the data report request controller 104 (as described above with reference to FIG. 1). For example, the request controller circuitry 212 may access, facilitate access, receive process, manipulate, provide, or otherwise use, or make available for use, data (e.g., constrained data report requests, constrained data reports, and/or other data) used by one or more other components of the apparatus 200 through, for example, the use of program code executed using a processor, such as the processor 206. In some embodiments, the request controller circuitry 212 may interact with the memory 204, which may store the aforementioned data. It should also be appreciated that, in some embodiments, the request controller circuitry 212 may include a separate processor, specially configured field programmable gate array (FPGA), or application specific interface circuit (ASIC) to provide or otherwise facilitate access to such data used by one or more other components of the apparatus 200. The request controller circuitry 212 may also provide for communication with other components of the apparatus, system and/or external systems via a network interface provided by the communications circuitry 210.

In some embodiments, the apparatus 200 may include a report generator circuitry 214 which may include hardware components, software components, and/or a combination thereof configured to, with the processing circuitry 202, input/output circuitry 208 and/or communications circuitry 210, perform one or more functions associated with the flexible data report generator 108 (as described above with reference to FIG. 1). For example, the report generator circuitry 214 may access, facilitate access, receive process, manipulate, provide, or otherwise use, or make available for use, data (e.g., constrained data report models, and/or other data) used by one or more other components of the apparatus 200 through, for example, the use of program code executed using a processor, such as the processor 206. In some embodiments, the report generator circuitry 214 may interact with the memory 204, which may store the aforementioned data. It should also be appreciated that, in some embodiments, the report generator circuitry 214 may include a separate processor, specially configured field programmable gate array (FPGA), or application specific interface circuit (ASIC) to receive such data utilized by the report generator circuitry 214. The report generator circuitry 214 may also provide for communication with other components of the apparatus, system and/or external systems via a network interface provided by the communications circuitry 210.

In some embodiments, the apparatus 200 may include a report repository circuitry 216 which may include hardware components, software components, and/or a combination thereof configured to, with the processing circuitry 202, input/output circuitry 208 and/or communications circuitry 210, perform one or more functions associated with the base report repository 110 and/or query-agnostic flexible API report repository 112 (as described above with reference to FIG. 1). For example, the report repository circuitry 216 may access, facilitate access, receive process, manipulate, provide, or otherwise use, or make available for use, certain data (e.g., query-specific scripts, query-specific instructions, optimized request-agnostic results sets, optimized request-agnostic queries, and/or other data) used by one or more other components of the apparatus 200 through, for example, the use of program code executed using a processor, such as the processor 206. In some embodiments, the report repository circuitry 216 may interact with the memory 204, which may store the aforementioned data. It should also be appreciated that, in some embodiments, the report repository circuitry 216 may include a separate processor, specially configured field programmable gate array (FPGA), or application specific interface circuit (ASIC) to manage access and use of such data. The report repository circuitry 216 may also provide for communication with other components of the apparatus, system and/or external systems via a network interface provided by the communications circuitry 210.

Example Data Flows for Servicing Constrained Data Report Requests

Figure 3:
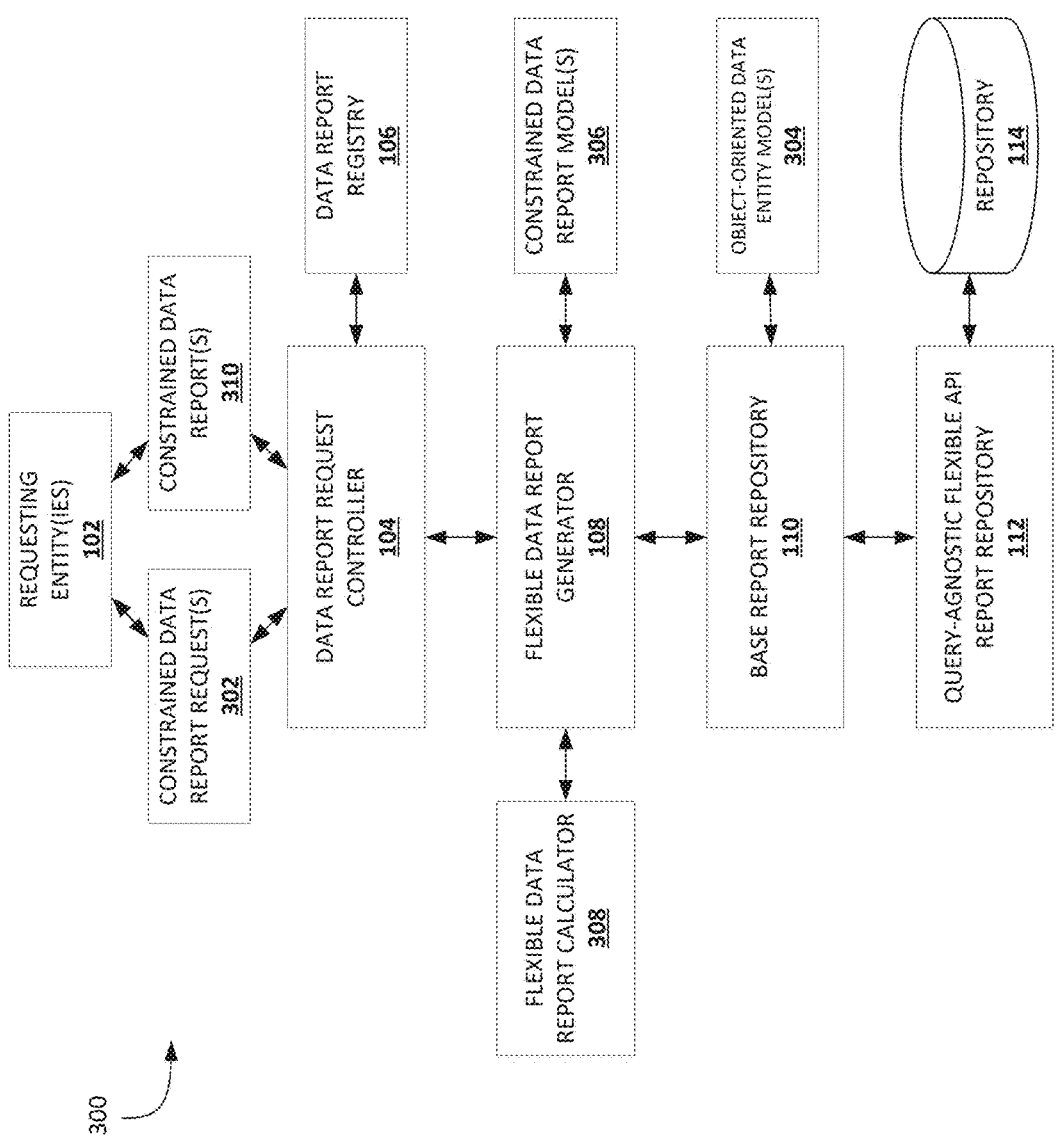
FIG. 3 illustrates an example data flow diagram showing example data structures in accordance with at least some embodiments of the present disclosure.

FIG. 3 is a data flow diagram 300 showing example data structures for servicing a constrained data report request 302 in accordance with at least some embodiments discussed herein. In some example embodiments, the data structures and processes shown and described with respect to the data flow diagram 300 of FIG. 3 may be generated, performed, and/or otherwise facilitated by the various systems and apparatuses shown and described with respect to FIGS. 1-2.

In some embodiments, one or more constrained data report requests may be received from a requesting entity. For example, the constrained data report request 302 may be received from the requesting entity 102. In various examples, a constrained data report request 302 may be used to query specific data from the repository 114 as specified by the requesting entity 102.

In various embodiments, the constrained data report request 302 may comprise an API call associated with the query-agnostic flexible API 101. In some examples, the constrained data report request 302 may include various query portions configured to indicate information about the constrained data report request 302 such as routing information, authentication information, data operations, query parameters, and/or the like. Such query portions may be determined at least in part by the requesting entity 102 (e.g., via one or more inputs received from a user).

In some embodiments, the constrained data report request 302 may be provided to the data report request controller 104. For example, the requesting entity 102 may be a computing device connected to the internet that generates the constrained data report request 302. The constrained data report request 302 may, for example, comprise a resource endpoint comprising a URL used to route the constrained data report request 302 to the query-agnostic flexible API 101 where the constrained data report request 302 is received via the data report request controller 104.

In various embodiments, the data report request controller 104 may analyze the constrained data report request 302 in order to service the constrained data report request 302. For example, the data report request controller 104 may parse the constrained data report request 302 to identify at least the resource endpoint, the endpoint action, the one or more repository constraints, and the one or more report constraints. Based on the analysis of the constrained data report request 302, the data report request controller 104 may identify the flexible data report generator 108 to further service the constrained data report request 302.

In some embodiments, the data report request controller 104 may identify the flexible data report generator 108 using the data report registry 106. For example, the data report request controller 104 may provide the constrained data report request 302, portions thereof, and/or data derivative thereof, to the data report registry 106 to receive information identifying the flexible data report generator 108. In some examples, flexible data report generator 108 may be identified based at least in part on the resource endpoint of the constrained data report request 302. For example, the data report registry 106 may identify the flexible data report generator 108 based at least in part on the resource endpoint. In some examples, the data report registry 106 may define one or more mappings between various query portions and flexible data report generators. For example, a particular resource endpoint may map to a particular flexible data report generator. In another example, a particular combination of resource endpoint and endpoint action may map to a particular flexible data report generator.

In some embodiments, the data report request controller 104 may provide the constrained data report request 302, portions thereof, and/or data derivative thereof, to the flexible data report generator 108. For example, the data report request controller 104 may call a program method of the flexible data report generator 108. In such an example, the data report request controller 104 may provide the flexible data report generator 108 one or more repository constraints of the constrained data report request 302 as parameters of the program method call.

In various embodiments, the flexible data report generator 108 may provide the constrained data report request 302, portions thereof, and/or data derivative thereof, to the base report repository 110. For example, the flexible data report generator 108 may call a program method of the base report repository 110. In such an example, the flexible data report generator 108 may provide the base report repository 110 one or more repository constraints of the constrained data report request 302 as parameters of the program method call.

In some embodiments, the base report repository 110 may provide the constrained data report request 302, portions thereof, and/or data derivative thereof, to the query-agnostic flexible API report repository 112. For example, the query-agnostic flexible API report repository 112 may extend a program method of the base report repository 110. In such an example, the base report repository 110 may provide the query-agnostic flexible API report repository 112 one or more repository constraints of the constrained data report request 302 as parameters of the program method call.

In certain embodiments, the base report repository 110 and/or the query-agnostic flexible API report repository 112 may be configured to generate a plurality of query-specific instructions for each repository constraint of the one or more repository constraints of the constrained data report request 302. For example, for each repository constraint of the one or more repository constraints, a query-specific script may be retrieved and by the base report repository 110 and/or the query-agnostic flexible API report repository 112, and the query-specific script may be transformed into a query-specific instruction according to the repository constraint. For example, the base report repository 110 and the query-agnostic flexible API report repository 112 may be configured to execute query-specific scripts to generate query-specific instructions based on repository constraints. In some examples, the query-specific scripts may map between object-oriented queries and query language queries. For example, the query-specific scripts may be executable object-oriented program code queries that, when executed, generate query-specific instructions that define queries of a query language.

In various embodiments, the query-agnostic flexible API report repository 112 may comprise query-specific scripts that extend from the base report repository 110 and comprise custom code and logic configured to provide additional functionalities and features over the base report repository 110. For example, the query-specific scripts of the query-agnostic flexible API report repository 112 may accept additional parameters (e.g., repository constraints) that the base report repository 110 is not configured to handle. Accordingly, the query-specific scripts of the query-agnostic flexible API report repository 112 may be configured to generate query-specific instructions that enable field projection, custom filtering, data aggregation, and and/or the like. In contrast, the query-specific instructions generated from the base report repository 110 may not enable field projection, custom filtering, data aggregation, and and/or the like, for example, in a case where the base report repository 110 is the JPA report repository. In this manner, example embodiments may provide advanced querying via the query-agnostic flexible API report repository 112.

In some embodiments, the query-agnostic flexible API report repository 112 may be configured to generate an optimized request-agnostic query based on the plurality of query-specific instructions. Additionally, the query-agnostic flexible API report repository 112 may be configured to execute the optimized request-agnostic query against the repository 114 to receive an optimized request-agnostic results set. In some examples, the query-agnostic flexible API report repository 112 may, for example, provide the optimized request-agnostic results set to the base report repository 110 in response to receiving the optimized request-agnostic results set. In some examples, the base report repository 110 may map the optimized request-agnostic results set to the object-oriented data entity model 304. The base report repository 110 may provide the object-oriented data entity model 304 to the flexible data report generator 108 to generate the constrained data report model 306. In some examples, the base report repository 110 may project the data entities comprised within the object-oriented data entity model 304 onto the constrained data report model 306. In various examples, the call made by the flexible data report generator 108 to the base report repository 110 may return the data of the object-oriented data entity model 304 and consequently generate the constrained data report model 306. Accordingly, the constrained data report model 306 may comprise the data entities of the object-oriented data entity model 304, and therefore, the optimized request-agnostic results set.

In some embodiments, the flexible data report generator 108 may generate the constrained data report model 306 further based on one or more report enrichment data entities. In some examples, the flexible data report generator 108 may use the flexible data report calculator 308 to generate the one or more report enrichment data entities. Once the constrained data report model 306 is finalized, the flexible data report generator 108 may provide the constrained data report model 306 to the data report request controller 104. The data report request controller 104 may receive the constrained data report model 306 and generate the constrained data report 310. In some examples, the call made by the data report request controller 104 to the flexible data report generator 108 may return the constrained data report model 306 and subsequently generate the constrained data report 310.

In various embodiments, the data report request controller 104 may apply one or more report constraints to the constrained data report model 306 to generate the constrained data report 310. For example, one or more report constraints of the constrained data report request 302 may define one or more transformations or data manipulations to be performed on the constrained data report model 306. As such, the data report request controller 104 may generate the constrained data report 310 according to the one or more report constraints. Once the constrained data report 310 is finalized, the data report request controller 104 may provide the constrained data report 310 to the requesting entity 102.

Figure 4:
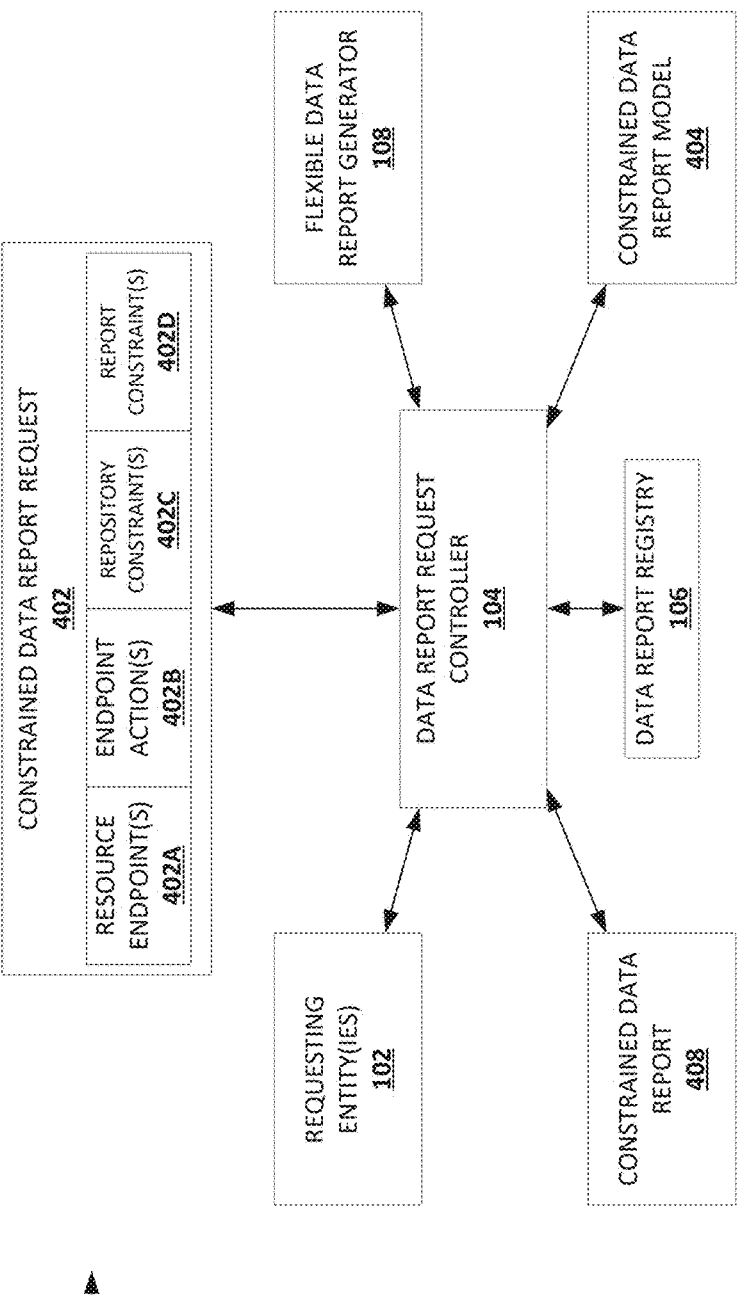
FIG. 4 illustrates an example data flow diagram showing example data structures in accordance with at least some embodiments of the present disclosure.

FIG. 4 is a data flow diagram 400 showing example data structures for servicing a constrained data report request 402 in accordance with at least some embodiments discussed herein. In some example embodiments, the data structures and processes shown and described with respect to the data flow diagram 400 of FIG. 4 may be generated, performed, and/or otherwise facilitated by the various systems and apparatuses shown and described with respect to FIGS. 1-2.

The constrained data report request 402 comprises a first query portion comprising the resource endpoint 402A. In some examples, the resource endpoint 402A may be associated with a repository (e.g., the repository 114). Additionally, the constrained data report request 402 comprises a second query portion comprising an endpoint action 402B. In some examples, retrieving an optimized request-agnostic results set is performed based at least in part on the endpoint action 402B. Additionally, the constrained data report request 402 comprises a third query portion comprising the one or more repository constraints 402C. In some examples, the repository constraints 402C may be used to indicate which data should be retrieved in response to the constrained data report request 402. Additionally, the constrained data report request 402 comprises a fourth query portion comprising the one or more report constraints 402D. In some examples, the report constraints 402D may be used to indicate a format or other parameters associated with returning the constrained data report 408 to the requesting entity 102.

In various embodiments, any number of query portions may be used within the constrained data report request 402 and any query portion may include any corresponding information associated with the constrained data report request 402 as described herein. In some examples, the various query portions 402A-D of the constrained data report request 402 and their respective contents may be determined by and/or otherwise associated with a REST architecture, the requesting entity 102, the repository 114, the data being requested, and/or the like.

In some embodiments, the constrained data report request 402 may be provided to the data report request controller 104. For example, the requesting entity 102 may generate the constrained data report request 402. The requesting entity 102 may, for example, access an interface provided by the query-agnostic flexible API 101 to specify the resource endpoint 402A, endpoint action 402B, repository constraints 402C, and/or report constraints 402D in order to query data within a repository. The constrained data report request 402 may be provided to the query-agnostic flexible API 101 and received at the data report request controller 104.

In certain embodiments, the data report request controller 104 may leverage the data report registry 106 in identifying the flexible data report generator 108 associated with the constrained data report request 402. For example, the data report registry 106 may define one or more mappings between various flexible data report generators and query portions of constrained data report requests. In one example, the flexible data report generator 108 may be associated with the resource endpoint 402A. Additionally or alternatively, the flexible data report generator 108 may be associated with the endpoint action 402B and/or the combination of the resource endpoint 402A and the endpoint action 402B.

In various embodiments, the data report request controller 104 may call the flexible data report generator 108 to further service the constrained data report request 402. For example, the data report request controller 104 may call one or more program methods of the flexible data report generator 108, and/or the like. Additionally, in some examples, the data report request controller 104 may provide the flexible data report generator 108 one or more repository constraints 402C and/or data derivative thereof, for example, as parameters of a program method call.

In some embodiments, the data report request controller 104 may receive the constrained data report model 404 as a result of calling the flexible data report generator 108. The constrained data report model 404 may comprise the data requested by the constrained data report request 402 as indicated by the repository constraints 402C.

In certain embodiments, the data report request controller 104 may be configured to generate the constrained data report 408. The constrained data report 408, for example, may be generated based on the constrained data report model 404 received from the flexible data report generator 108. In various examples, the data report request controller 104 may apply one or more report constraints 402D to the constrained data report model 404 to generate the constrained data report 408. For example, the report constraint 402D may specify the constrained data report 408 should be in a.csv file format. Accordingly, the data report request controller 104 may transform the constrained data report model 404 into a.csv file format to generate the constrained data report 408. Once the constrained data report 408 is finalized according to the report constraints 402D, the data report request controller 104 may provide the constrained data report 408 to the requesting entity 102.

In a non-limiting contextual example, the requesting entity 102 may be used by an individual who wishes to view a line chart for the sales of a business meeting complex constraints. For example, the line chart may be for the sales of stores in particular regions meeting one or more additional criteria. Additionally, the individual using the requesting entity 102 may want the results to be grouped by product category and sorted in an ascending order based on an additional variable. In some examples, the user may define a computer program which automatically causes the requesting entity 102 to generate the constrained data report request 402. In other examples, the user may provide manual inputs which cause the requesting entity 102 to generate the constrained data report request 402. In yet other examples, the user may provide manual inputs which causes the requesting entity 102 to access an interface associated with the query-agnostic flexible API 101 which generates the constrained data report request 402.

In one example, the requesting entity 102 may begin generating the constrained data report request 402 in response to user inputs or automatically in response to a computer program. The requesting entity 102 may generate the constrained data report request 402 by providing a notation associated with the query-agnostic flexible API 101 (e.g., Java-based commands, overloaded findAll( ) methods, and/or the like, according to the specification associated with the query-agnostic flexible API 101). For example, the requesting entity 102 may use a programming language to generate the constrained data report request 402 by specifying the resource endpoint 402A as the appropriate resource endpoint to query the business sales data. Additionally, the requesting entity 102 may specify variables to query such as "Sales," "Product Category," "Region," and "Date," and specify one or more corresponding repository constraints 402C such as a particular region, a particular start date value, a particular end date value, a grouping based the product category, and/or the like. Additionally, the requesting entity 102 may specify the endpoint action 402B to be "GET" such that the query returns data and the requesting entity 102 may generate the line chart of the sales from the returned data. Additionally, the requesting entity 102 may specify the report constraint 402D to return a .csv file.

In another example, the requesting entity 102 may access an interface provided by the query-agnostic flexible API 101 and the query-agnostic flexible API 101 may begin generating the constrained data report request 402 automatically in response to interactions with the interface. For example, the query-agnostic flexible API 101 may provide an interface accessible by the requesting entity 102 that provides lists of variables for selection and corresponding input fields to receive values. Such lists and input fields may be used to select variables such as "Sales," "Product Category," "Region," and "Date," and specify values such as a particular region, a start date, an end date, a group by variable, and/or the like. Accordingly, the query-agnostic flexible API 101 may convert the selections and corresponding values received from the requesting entity 102 at the interface into a corresponding constrained data report request 402 (e.g., by automatically generating the resource endpoint 402A, endpoint action 402B, repository constraints 402C, and/or report constraints 402D based on selections and inputs received at the interface).

Importantly, the requesting entity 102 does not need to provide or use a query language associated with the repository where the data is stored. For example, if the requesting entity 102 is querying data stored in a SQL repository, the requesting entity 102 does not need to provide any SQL commands. Instead, the requesting entity 102 may specify constrained data report requests in a notation (e.g., a Java notation) according to the query-agnostic flexible API 101 specification and/or use the interface provided by the query-agnostic flexible API 101. In this manner, the user of a requesting entity 102 may not need to type SQL queries or understand or consider the complexities of the underlying SQL queries that the query-agnostic flexible API 101 will generate from constrained data report requests to query a repository.

Continuing the non-limiting contextual example, the constrained data report request 402 may be provided to the data report request controller 104 once the requesting entity 102 sends the constrained data report request 402. The data report request controller 104 may, using the data report registry 106, identify the flexible data report generator 108. For example, the flexible data report generator 108 may be the particular flexible data report generator used for a constrained data report request querying the "Sales" table with a "GET" request. Accordingly, the flexible data report generator 108 may be called to further service the constrained data report request 402. The flexible data report generator 108 may return the constrained data report model 404 to the data report request controller 104 which may comprise the sales data meeting the various repository constraints 402C. However, the constrained data report model 404 may still comprise one or more Java data objects and as such, may not be compliant with the report constraints 402D. The data report request controller 104 may generate the constrained data report 408 by generating a .csv file from the constrained data report model 404 and provide the .csv file to the requesting entity 102.

Figure 5:
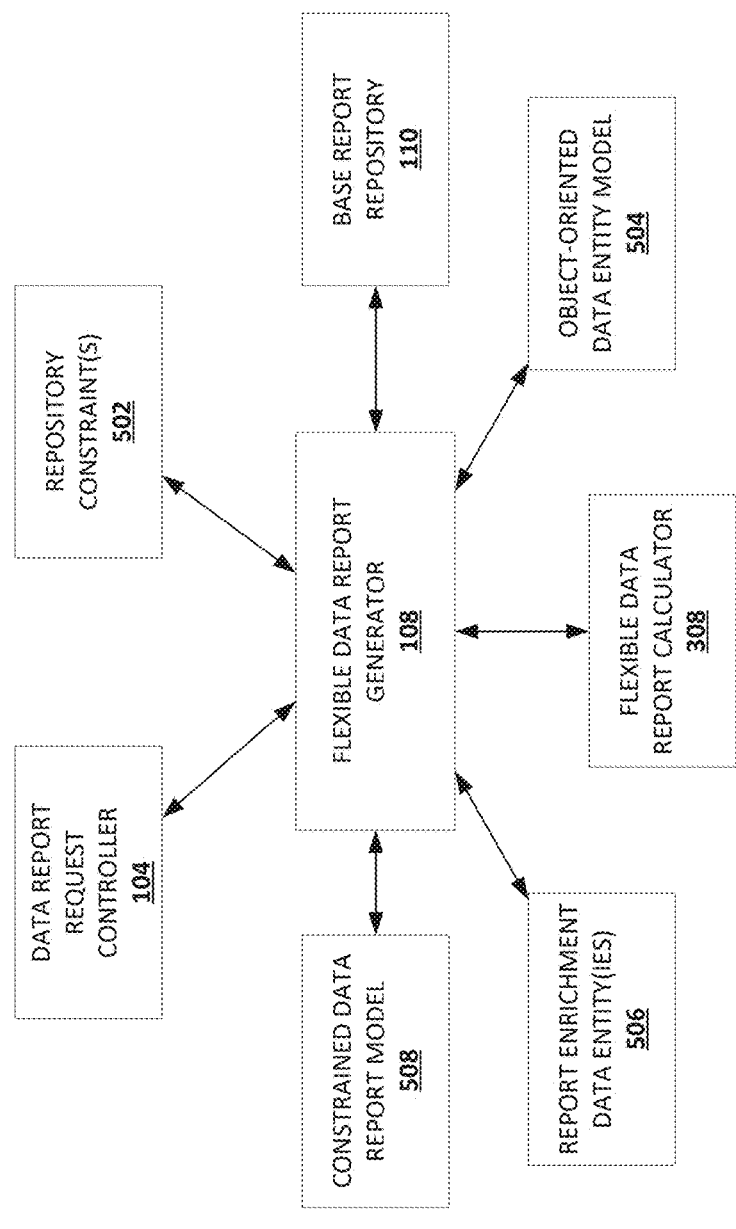
FIG. 5 illustrates an example data flow diagram showing example data structures in accordance with at least some embodiments of the present disclosure.

FIG. 5 is a data flow diagram 500 showing example data structures for servicing a constrained data report request in accordance with at least some embodiments discussed herein. In some example embodiments, the data structures and processes shown and described with respect to the data flow diagram 500 of FIG. 5 may be generated, performed, and/or otherwise facilitated by the various systems and apparatuses shown and described with respect to FIGS. 1-2.

In some embodiments, the flexible data report generator 108 may receive a constrained data report request, portions thereof, and/or data derivative thereof from the data report request controller 104. For example, the flexible data report generator 108 may receive at least one or more repository constraints 502 and/or data derivative thereof, from the data report request controller 104.

In some examples, the flexible data report generator 108 may be configured to execute program code in response to being called by the data report request controller 104. For example, the flexible data report generator 108 may execute one or more program methods called by the data report request controller 104 and receive the one or more repository constraints 502, or data derivative thereof, as parameters of such calls.

In various embodiments, the flexible data report generator 108 may be configured to call one or more program methods defined by the base report repository 110 and provide one or more repository constraints 502 and/or data derivative thereof to the base report repository 110. Additionally or alternatively, in some examples, the flexible data report generator 108 may be configured to call one or more program methods defined by the query-agnostic flexible API report repository 112. In various examples, if the flexible data report generator 108 calls a program method defined by both the base report repository 110 and the query-agnostic flexible API report repository 112, the query-agnostic flexible API report repository may be called since the query-agnostic flexible API report repository extends the base report repository 110. In other examples, provided parameters associated with the program method may determine whether the base report repository 110 or the query-agnostic flexible API report repository is called based on which report repository is suited to handle the provided parameters.

In certain embodiments, the flexible data report generator 108 may receive the object-oriented data entity model 504 from the base report repository 110 as a result of calling the base report repository 110 (or as a result of calling the query-agnostic flexible API report repository 112). The flexible data report generator 108 may generate the constrained data report model 508 based on the object-oriented data entity model 504. In some examples, the object-oriented data entity model 504 may be configured to project data comprised therein onto the constrained data report model 508, for example, as a result of the flexible data report generator 108 calling the base report repository 110.

In some embodiments, the flexible data report generator 108 may generate one or more additional report enrichment data entities 506 using the flexible data report calculator 308. In such examples, the constrained data report model 508 may be further generated based on the report enrichment data entities 506. In various examples, the flexible data report generator 108 may provide the constrained data report model 508 to the data report request controller 104 to further service the constrained data report request.

Continuing the non-limiting example from FIG. 4, the flexible data report generator 108 may comprise program code configured to perform one or more operations to organize the data being requested according to the repository constraints 402C. For example, the flexible data report generator 108 may call a plurality of query-specific scripts extended by the query-agnostic flexible API report repository 112 and organize the results returned by the object-oriented data entity model 504 into the constrained data report model 508.

Additionally, in some embodiments, the flexible data report generator 108 may perform special processing of certain data entities (e.g., using customized annotations), for example, by generating report enrichment data entities 506. For example, the requesting entity 102 may request a "Profits" data entity in the constrained data report request 402 in a case where the repository 114 only contains "Expenses" and "Sales" data entities. Accordingly, the flexible data report generator 108, using the flexible data report calculator 308, may be configured to generate a report enrichment data entity 506 "Profits" by subtracting the "Expenses" from the "Sales." The flexible data report generator 108 may include the "Profits" report enrichment data entity 506 and the "Sales" in the constrained data report model 508 and exclude the "Expenses" as it was not requested for by the constrained data report request, but only needed to generate the "Profits" report enrichment data entity 506. In this manner, example embodiments may provide report enrichment via one or more post-query operations.

Figure 6:
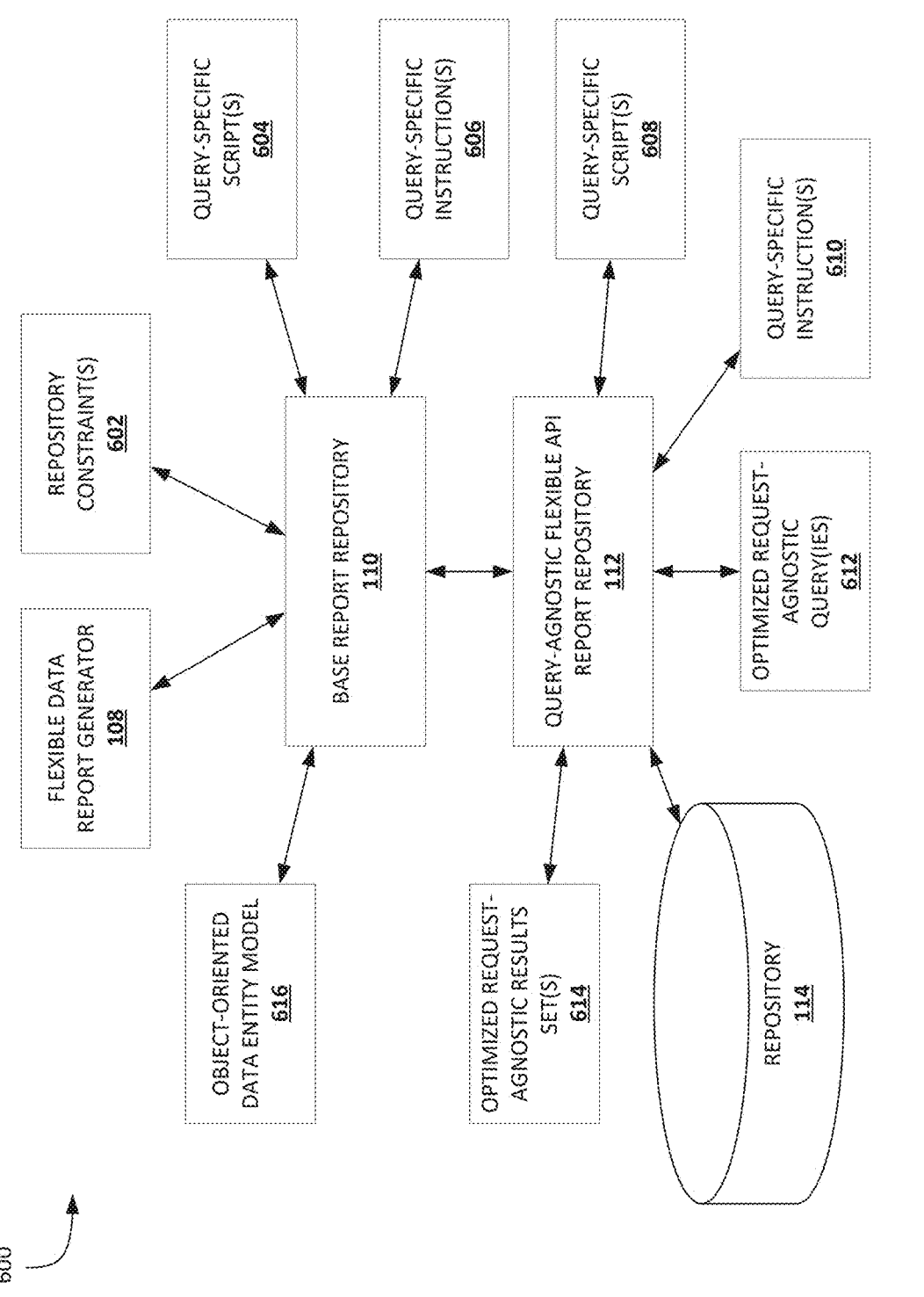
FIG. 6 illustrates an example data flow diagram showing example data structures in accordance with at least some embodiments of the present disclosure.

FIG. 6 is a data flow diagram 600 showing example data structures for servicing a constrained data report request in accordance with at least some embodiments discussed herein. In some example embodiments, the data structures and processes shown and described with respect to the data flow diagram 600 of FIG. 6 may be generated, performed, and/or otherwise facilitated by the various systems and apparatuses shown and described with respect to FIGS. 1-2.

In various embodiments, the base report repository 110 may receive a constrained data report request, portions thereof, and/or data derivative thereof from the flexible data report generator 108. For example, the base report repository 110 may receive at least one or more repository constraints 602 and/or data derivative thereof, from the flexible data report generator 108 and perform one or more operations in response.

In some embodiments, the base report repository 110 may be configured to execute one or more query-specific scripts 604 in response to being called by the flexible data report generator 108. The base report repository 110 may, for example, receive the one or more repository constraints 602 as parameters of one or more such calls from the flexible data report generator 108. In some examples, the base report repository 110 may be configured to generate one or more query-specific instructions 606 by executing a respective one or more query-specific scripts 604. For example, the base report repository 110 may retrieve a query-specific script 604 for each repository constraint 602 and transform the query-specific script 604 into a query-specific instruction 606. In some examples, the repository constraints 602 may be used as one or more parameters or values used within a query-specific script 604 to generate a corresponding query-specific instruction 606.

In certain embodiments, the base report repository 110 may be extended by the query-agnostic flexible API report repository 112. The base report repository 110 may, for example, call the query-agnostic flexible API report repository 112 in a case where the query-agnostic flexible API report repository 112 extends a query-specific script 604 being called at the base report repository 110. The base report repository 110 may forward calls and/or other data necessary for the query-agnostic flexible API report repository 112 to process such calls. The query-agnostic flexible API report repository 112 may, similarly to the base report repository 110, retrieve a query-specific script 608 for each repository constraint 602 and transform the query-specific script 608 into a query-specific instruction 610.

In various embodiments, the query-agnostic flexible API report repository 112 may be configured to generate one or more optimized request-agnostic queries 612 based on one or more query-specific instructions 610 and/or one or more query-specific instructions 606. The query-agnostic flexible API report repository 112 may be configured to query the repository 114 using the optimized request-agnostic queries 612 and receive the optimized request-agnostic results set 614 from the repository 114 in response. The optimized request-agnostic results set 614, for example, may include the data entities matching the one or more repository constraints 602.

In some embodiments the query-agnostic flexible API report repository 112 may be configured to provide the optimized request-agnostic results set 614 to the base report repository 110 to generate the object-oriented data entity model 616. For example, the base report repository 110 may generate the object-oriented data entity model 616 by mapping the data entities of the optimized request-agnostic results set 614 to one or more objects of the object-oriented data entity model 616. In this manner, the object-oriented data entity model 616, the base report repository 110, and/or the query-agnostic flexible API report repository 112 may provide the functionality of an object relational mapping for example embodiments described herein.

In certain embodiments, one or more of the operations described herein with respect to the query-agnostic flexible API report repository 112 and the base report repository 110 may be performed by either the query-agnostic flexible API report repository 112, the base report repository 110, and/or some combination thereof. For example, the query-agnostic flexible API report repository 112 may be configured to directly receive one or more repository constraints 602 and/or data derivative thereof from the flexible data report generator 108; the query-agnostic flexible API report repository 112 may be configured to generate and/or provide the object-oriented data entity model 616 to the flexible data report generator 108; the query-agnostic flexible API report repository 112 may be configured to project the data entities of the object-oriented data entity model 616 onto the constrained data report model; the base report repository 110 may be configured to generate the optimized request-agnostic queries 612 and/or query the repository 114 using the optimized request-agnostic queries 612; and/or the like.

Continuing the non-limiting example from FIG. 4, the query-specific scripts 604 and 608 may be called by the flexible data report generator in generating the constrained data report model. Accordingly, the query-specific instructions 606 and 610 may be the SQL query segments configured to apply the repository constraints defined by the requesting entity 102. One or more of the various SQL segments may be organized into the optimized request-agnostic query 612 before being executed against the repository 114 to retrieve the data for the line chart of the requesting entity 102. The optimized request-agnostic results set 614 may be the raw data defined by one or more of the repository constraints prior to being processed and organized as the constrained data report model and constrained data report, and prior to any post-query operations or report enrichment operations (e.g., the generation of report enrichment data entities).

Example Processes

FIG. 7 illustrates an example flowchart depicting operations for generating a constrained data report in accordance with at least some example embodiments of the present disclosure. As depicted at block 702, the process 700 begins with receiving a constrained data report request. In some embodiments, the constrained data report request is received from a requesting entity and may comprise a resource endpoint, one or more repository constraints, and one or more report constraints. In some examples, the constrained data report request may be received by the query-agnostic flexible API 101 (e.g., at the data report request controller 104, via request controller circuitry 212) from a requesting entity (e.g., requesting entity 102). In various examples, the constrained data report request may comprise an API call. For example, the constrained data report request may be an API call associated with the query-agnostic flexible API 101.

In some embodiments, the constrained data report request may comprise one or more query portions. For example, the constrained data report request may comprise a first query portion comprising a resource endpoint, a second query portion comprising an endpoint action, a third query portion comprising one or more repository constraints, a fourth query portion comprising one or more report constraints, and/or any other query portions. In some examples, the resource endpoint of a constrained data report request may be associated with a repository (e.g., repository 114).

Certain embodiments may further include parsing the constrained data report request. For example, the constrained data report request may be parsed by the query-agnostic flexible API 101 (e.g., at the data report request controller 104, via the request controller circuitry 212) to identify at least the resource endpoint, the endpoint action, the one or more repository constraints, and the one or more report constraints. Additionally, a flexible data report generator (e.g., flexible data report generator 108) may be identified based at least in part on the resource endpoint. Additionally, at least the one or more repository constraints may be provided to the flexible data report generator 108.

At block 704, the process continues with generating an optimized request-agnostic query. For example, an optimized request-agnostic query may be generated based at least in part on the constrained data report request. In some examples, the optimized request-agnostic query may be generated by generating a plurality of query-specific instructions by, for each repository constraint of the one or more repository constraints, retrieving, from a plurality of query-specific scripts, a query-specific script and transforming the query-specific script into a query-specific instruction according to the repository constraint, and generating the optimized request-agnostic query based on the plurality of query-specific instructions. In various examples, the optimized request-agnostic query may be generated by the query-agnostic flexible API 101 (e.g., using the query-agnostic flexible API report repository 112, via the report repository circuitry 216).

In some embodiments, one or more of the plurality of query-specific scripts may be defined by the query-agnostic flexible API report repository 112 and the query-agnostic flexible API report repository 112 may extend the base report repository 110. In various examples, transforming the query-specific script into the query-specific instruction according to the repository constraint is based on the base report repository 110, for example, in a case where the base report repository 110 defines the query-specific script. In some examples, transforming the query-specific script into the query-specific instruction according to the repository constraint is based on the query-agnostic flexible API report repository 112, for example, in a case where the query-agnostic flexible API report repository 112 defines the query-specific script.

In various embodiments, executing the optimized request-agnostic query is based at least in part on the query-agnostic flexible API report repository 112. For example, the query-agnostic flexible API report repository 112 may be configured to execute the optimized request-agnostic query at the repository 114 (e.g., via the report repository circuitry 216). In various examples, the query-agnostic flexible API report repository 112 may define a relationship mapping between one or more of the one or more repository constraints, one or more of the plurality of query-specific scripts, and one or more query-specific instructions.

At block 706, the process continues with retrieving an optimized request-agnostic results set. For example, the optimized request-agnostic results set may be retrieved from a repository (e.g., repository 114) associated with the resource endpoint and by executing the optimized request-agnostic query. In some examples, the optimized request-agnostic results set is retrieved by the query-agnostic flexible API 101 (e.g., using the query-agnostic flexible API report repository 112, via report repository circuitry 216). In various examples, retrieving an optimized request-agnostic results set is performed based at least in part on the endpoint action. For example, the endpoint action may cause the retrieval of data when querying the repository 114.

At block 708, the process continues with generating a constrained data report and providing the constrained data report. For example, the constrained data report may be generated based at least in part on the optimized request-agnostic results set and the one or more report constraints and the constrained data report may be provided to the requesting entity. In some examples, the constrained data report may be generated by the query-agnostic flexible API 101 (e.g., using the data report request controller 104, via request controller circuitry 212).

In some embodiments, the constrained data report may be based on a constrained data report model. For example, some embodiments may further include providing at least the one or more repository constraints to a base report repository associated with the flexible data report generator 108. Additionally, an object-oriented data entity model comprising one or more data entities may be received from the base report repository 110. For example, the one or more data entities may comprise the optimized request-agnostic results set. Additionally, the constrained data report model may be generated based at least on the one or more data entities of the object-oriented data entity model.

In certain embodiments, generating the constrained data report model may comprise generating one or more report enrichment data entities based at least on the one or more data entities of the object-oriented data entity model. For example, the constrained data report model may be generated based at least on the one or more data entities of the object-oriented data entity model and the one or more report enrichment data entities. In some examples, the constrained data report model may be generated by the query-agnostic flexible API 101 (e.g., using the flexible data report generator 108, via the report generator circuitry 214).

Various embodiments may further include providing the constrained data report model to the data report request controller and generating the constrained data report by modifying the constrained data report model according to the one or more report constraints. Additionally, in some examples, the constrained data report may be provided to the requesting entity 102 via the data report request controller 104.

Application of Techniques

A person of skill in the art, having benefit of this disclosure, may recognize various ways for applying or implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks, such as any similar tasks, including but not limited to the various inputs and outputs, described herein. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one memory, the at least one memory comprising computer coded instructions therein, wherein the computer coded instructions are configured to, when executed by the at least one processor, cause the apparatus to:

receive, from a requesting entity, a constrained data report request, the constrained data report request associated with one or more object-oriented data objects of an object-oriented programming language, and comprising a resource endpoint, one or more repository constraints, and one or more report constraints;

generate, based at least in part on the constrained data report request, an optimized request-agnostic query configured to cause retrieval of data when applied to a repository associated with the resource endpoint, by:

generating a plurality of query-specific instructions by, for each repository constraint of the one or more repository constraints:

retrieving, from at least one of a base report repository or a query-agnostic flexible API report repository defining a plurality of query-specific scripts, a query-specific script, wherein the query-specific script comprises computer executable code of the object-oriented programming language configured to map at least one of the one or more object-oriented data objects to at least one resource of the repository; and transforming, based on the at least one of the base report repository or the query-agnostic flexible API report repository, the query-specific script into a query-specific instruction according to the repository constraint; and generating the optimized request-agnostic query based on the plurality of query-specific instructions;

retrieve, from the repository and by executing the optimized request-agnostic query, an optimized request-agnostic results set;

generate a constrained data report model using an object-oriented data entity model, the object-oriented data entity model configured to map the optimized request-agnostic results set to the one or more object-oriented data objects and project the optimized request-agnostic results set onto the constrained data report model;

generate, by modifying the constrained data report model according to the one or more report constraints, a constrained data report; and output, to the requesting entity in an object-oriented software development environment, the constrained data report.

2. The apparatus of claim 1, wherein the constrained data report request comprises an API call associated with a query-agnostic flexible API.

3. The apparatus of claim 1, wherein the constrained data report request comprises at least 1) a first query portion comprising the resource endpoint, wherein the resource endpoint is associated with the repository, 2) a second query portion comprising an endpoint action, wherein retrieving the optimized request-agnostic results set is performed based at least in part on the endpoint action, 3) a third query portion comprising the one or more repository constraints, and 4) a fourth query portion comprising the one or more report constraints.

4. The apparatus of claim 3, wherein the computer coded instructions are configured to, when executed by the at least one processor, further cause the apparatus to:

parse the constrained data report request to identify at least the resource endpoint, the endpoint action, the one or more repository constraints, and the one or more report constraints;

identify a flexible data report generator based at least in part on the resource endpoint; and provide at least the one or more repository constraints to the flexible data report generator.

5. The apparatus of claim 4, wherein to generate the constrained data report model further comprises:

providing at least the one or more repository constraints to the base report repository, the base report repository being associated with the flexible data report generator;

receiving, from the base report repository, the object-oriented data entity model comprising one or more data entities, the one or more data entities comprising the optimized request-agnostic results set; and generating the constrained data report model based at least on the one or more data entities of the object-oriented data entity model.

6. The apparatus of claim 5, wherein the computer coded instructions are configured to, when executed by the at least one processor, further cause the apparatus to:

provide the constrained data report model to a data report request controller;

and wherein the constrained data report is provided to the requesting entity via the data report request controller.

7. The apparatus of claim 5, wherein generating the constrained data report model further comprises:

generating one or more report enrichment data entities based at least on the one or more data entities of the object-oriented data entity model; and generating the constrained data report model based at least on the one or more data entities of the object-oriented data entity model and the one or more report enrichment data entities.

8. The apparatus of claim 5, wherein the query-agnostic flexible API report repository extends the base report repository.

9. The apparatus of claim 8, wherein transforming the query-specific script into the query-specific instruction according to the repository constraint is based on the base report repository in a case where the base report repository defines the query-specific script and is based on the query-agnostic flexible API report repository in a case where the query-agnostic flexible API report repository defines the query-specific script.

10. The apparatus of claim 8, wherein executing the optimized request-agnostic query is based at least in part on the query-agnostic flexible API report repository.

11. The apparatus of claim 8, wherein the query-agnostic flexible API report repository defines a relationship mapping between one or more of the one or more repository constraints, one or more of the plurality of query-specific scripts, and one or more query-specific instructions.

12. A computer-implemented method comprising:

receiving, by one or more processors, from a requesting entity, a constrained data report request, the constrained data report request associated with one or more object-oriented data objects of an object-oriented programming language, and comprising a resource endpoint, one or more repository constraints, and one or more report constraints;

generating, by one or more processors, based at least in part on the constrained data report request, an optimized request-agnostic query configured to cause retrieval of data when applied to a repository associated with the resource endpoint, by:

generating a plurality of query-specific instructions by, for each repository constraint of the one or more repository constraints:

retrieving, from at least one of a base report repository or a query-agnostic flexible API report repository defining a plurality of query-specific scripts, a query-specific script, wherein the query-specific script comprises computer executable code of the object-oriented programming language configured to map at least one of the one or more object-oriented data objects to at least one resource of the repository; and transforming, based on the at least one of the base report repository or the query-agnostic flexible API report repository, the query-specific script into a query-specific instruction according to the repository constraint; and generating the optimized request-agnostic query based on the plurality of query-specific instructions;

retrieving, by one or more processors, from the repository and by executing the optimized request-agnostic query, an optimized request-agnostic results set;

generating, by one or more processors, a constrained data report model using an object-oriented data entity model, the object-oriented data entity model configured to map the optimized request-agnostic results set to the one or more object-oriented data objects and project the optimized request-agnostic results set onto the constrained data report model;

generating, by one or more processors, by modifying the constrained data report model according to the one or more report constraints, a constrained data report; and outputting, by one or more processors, to the requesting entity in an object-oriented software development environment, the constrained data report.

13. The computer-implemented method of claim 12, wherein the constrained data report request comprises an API call associated with a query-agnostic flexible API.

14. The computer-implemented method of claim 12, wherein the constrained data report request comprises at least 1) a first query portion comprising the resource endpoint, wherein the resource endpoint is associated with the repository, 2) a second query portion comprising an endpoint action, wherein retrieving the optimized request-agnostic results set is performed based at least in part on the endpoint action, 3) a third query portion comprising the one or more repository constraints, and 4) a fourth query portion comprising the one or more report constraints.

15. The computer-implemented method of claim 14 further comprising:

parsing the constrained data report request to identify at least the resource endpoint, the endpoint action, the one or more repository constraints, and the one or more report constraints;

identifying a flexible data report generator based at least in part on the resource endpoint; and providing at least the one or more repository constraints to the flexible data report generator.

16. The computer-implemented method of claim 15, wherein generating the constrained data report model further comprises:

providing at least the one or more repository constraints to the base report repository, the base report repository being associated with the flexible data report generator;

receiving, from the base report repository, the object-oriented data entity model comprising one or more data entities, the one or more data entities comprising the optimized request-agnostic results set; and generating the constrained data report model based at least on the one or more data entities of the object-oriented data entity model.

17. The computer-implemented method of claim 16 further comprising:

providing the constrained data report model to a data report request controller;

and wherein the constrained data report is provided to the requesting entity via the data report request controller.

18. The computer-implemented method of claim 16, wherein generating the constrained data report model further comprises:

generating one or more report enrichment data entities based at least on the one or more data entities of the object-oriented data entity model; and generating the constrained data report model based at least on the one or more data entities of the object-oriented data entity model and the one or more report enrichment data entities.

19. The computer-implemented method of claim 16, wherein the query-agnostic flexible API report repository extends the base report repository.

20. A computer program product comprising at least one computer-readable storage medium having computer-readable program code portions stored therein, the computer-readable program code portions comprising executable portions configured to cause at least one processor to:

receive, from a requesting entity, a constrained data report request, the constrained data report request associated with one or more object-oriented data objects of an object-oriented programming language, and comprising a resource endpoint, one or more repository constraints, and one or more report constraints;

generate, based at least in part on the constrained data report request, an optimized request-agnostic query configured to cause retrieval of data when applied to a repository associated with the resource endpoint, by:

generating a plurality of query-specific instructions by, for each repository constraint of the one or more repository constraints:

retrieving, from at least one of a base report repository or a query-agnostic flexible API report repository defining a plurality of query-specific scripts, a query-specific script, wherein the query-specific script comprises computer executable code of the object-oriented programming language configured to map at least one of the one or more object-oriented data objects to at least one resource of the repository; and transforming, based on the at least one of the base report repository or the query-agnostic flexible API report repository, the query-specific script into a query-specific instruction according to the repository constraint; and generating the optimized request-agnostic query based on the plurality of query-specific instructions;

retrieve, from the repository and by executing the optimized request-agnostic query, an optimized request-agnostic results set;

generate a constrained data report model using an object-oriented data entity model, the object-oriented data entity model configured to map the optimized request-agnostic results set to the one or more object-oriented data objects and project the optimized request-agnostic results set onto the constrained data report model;

generate, by modifying the constrained data report model according to the one or more report constraints, a constrained data report; and output, to the requesting entity in an object-oriented software development environment, the constrained data report.

\* \* \* \* \*